US012739021B2

(12) United States Patent
Shin et al.

(10) Patent No.: US 12,739,021 B2
(45) Date of Patent: Sep. 15, 2026

(54) METHOD AND DEVICE FOR UPLINK TRANSMISSION AND RECEPTION IN WIRELESS COMMUNICATION SYSTEM

(71) Applicant: LG Electronics Inc., Seoul (KR)

(72) Inventors: Seokmin Shin, Seoul (KR); Jaehyung Kim, Seoul (KR); Haewook Park, Seoul (KR); Kijun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 163 days.

(21) Appl. No.: 18/562,160

(22) PCT Filed: Jun. 3, 2022

(86) PCT No.: PCT/KR2022/007924
§ 371 (c)(1),
(2) Date: Nov. 17, 2023

(87) PCT Pub. No.: WO2022/260364
PCT Pub. Date: Dec. 15, 2022

(65) Prior Publication Data

US 2024/0243807 A1 Jul. 18, 2024

(30) Foreign Application Priority Data

Jun. 11, 2021 (KR) ........................ 10-2021-0075915

(51) Int. Cl.
*H04B 7/185* (2006.01)
*H04W 56/00* (2009.01)
*H04W 74/0833* (2024.01)

(52) U.S. Cl.
CPC .... *H04B 7/18513* (2013.01); *H04W 56/0045* (2013.01); *H04W 74/0833* (2013.01)

(58) Field of Classification Search
None
See application file for complete search history.

(56) References Cited

U.S. PATENT DOCUMENTS

2008/0085715 A1 4/2008 Alm et al.
2018/0324850 A1* 11/2018 Amuru .................. H04W 48/12
2020/0245200 A1* 7/2020 Xiong .................. H04W 76/11

FOREIGN PATENT DOCUMENTS

CN 112787712 5/2021
KR 10-2014-0053296 5/2014
(Continued)

OTHER PUBLICATIONS

Catt, "Time and frequency synchronization for NB-IoT/eMTC," R1-2104504, 3GPP TSG RAN WG1, #105-e, e-Meeting, May 19-27, 2021, 8 pages.

(Continued)

*Primary Examiner* — Walter J Divito
(74) *Attorney, Agent, or Firm* — Fish & Richardson P.C.

(57) ABSTRACT

A method and device for uplink transmission and reception in a wireless communication system are disclosed. A method for performing uplink transmission by a terminal in a wireless communication system according to an embodiment of the present disclosure may comprise the steps of: receiving first information about a satellite orbit, second information about a common timing advance (TA), and third information related to a TA update cycle from a base station; calculating a first TA on the basis of the first information and the second information; performing a first uplink transmission on the basis of the first TA; updating the first TA to a second TA at a specific time point based on the third information; and performing a second uplink transmission on the basis of the second TA.

13 Claims, 15 Drawing Sheets

· Common TA(Tcom) = 2*D0/c
· UE specific differential TA for xth UE (TUEx) = 2*(D1x−D0)/c
· Full TA(Tfull) = Tcom + TUEx (a) Regenerative payload · Common TA(Tcom) = 2*(D01+D02)/c
· UE specific differential TA for xth UE (TUEx) = 2*(D1x−D01)/c
· Full TA(Tfull) = Tcom + TUEx (b)Transparent payload

(56) References Cited

FOREIGN PATENT DOCUMENTS

| KR | 10-2017-0140227 | 12/2017 |
|---|---|---|
| KR | 10-2018-0127998 | 11/2018 |

OTHER PUBLICATIONS

CEWiT, IITH, IITM, Tejas Networks, Reliance Jio, "Further discussion on UL time synchronization methods for NTN systems," R1-2103731, 3GPP TSG RAN WG1, #104b-e, E-meeting, Apr. 12-20, 2021, 8 pages.

Extended European Search Report in European Appln. No. 22820492.1, mailed on Oct. 24, 2024 15 pages.

LG Electronics, "Discussion on UL time and frequency synchronization enhancements in NTN," R1-2100704, 3GPP TSG RAN WG1, #104-e, e-Meeting, Jan. 25-Feb. 5, 2021, 8 pages.

LG Electronics, "Discussion on UL time and frequency synchronization enhancements in NTN," R1-2105478, 3GPP TSG RAN WG1, #105-e, e-Meeting, May 10-27, 2021, 9 pages.

Office Action in Japanese Appln. No. 2023-575955, mailed on Sep. 10, 2024, 2 pages.

International Search Report and Written Opinion in Appln. No. PCT/KR2022/007924, mailed on Sep. 15, 2022, 6 pages (with English translation).

Moderator (MediaTek), "Summary #2 of AI 8.15.2 Enhancements to time and frequency synchronization," R1-2103908, 3GPP TSG RAN WG1 Meeting #104bis-e, Apr. 12-20, 2021, 77 pages.

Office Action in Korean Appln. No. 10-2023-7038855, mailed on Jun. 12, 2026, 14 pages (with English translation).

* cited by examiner

FIG.6

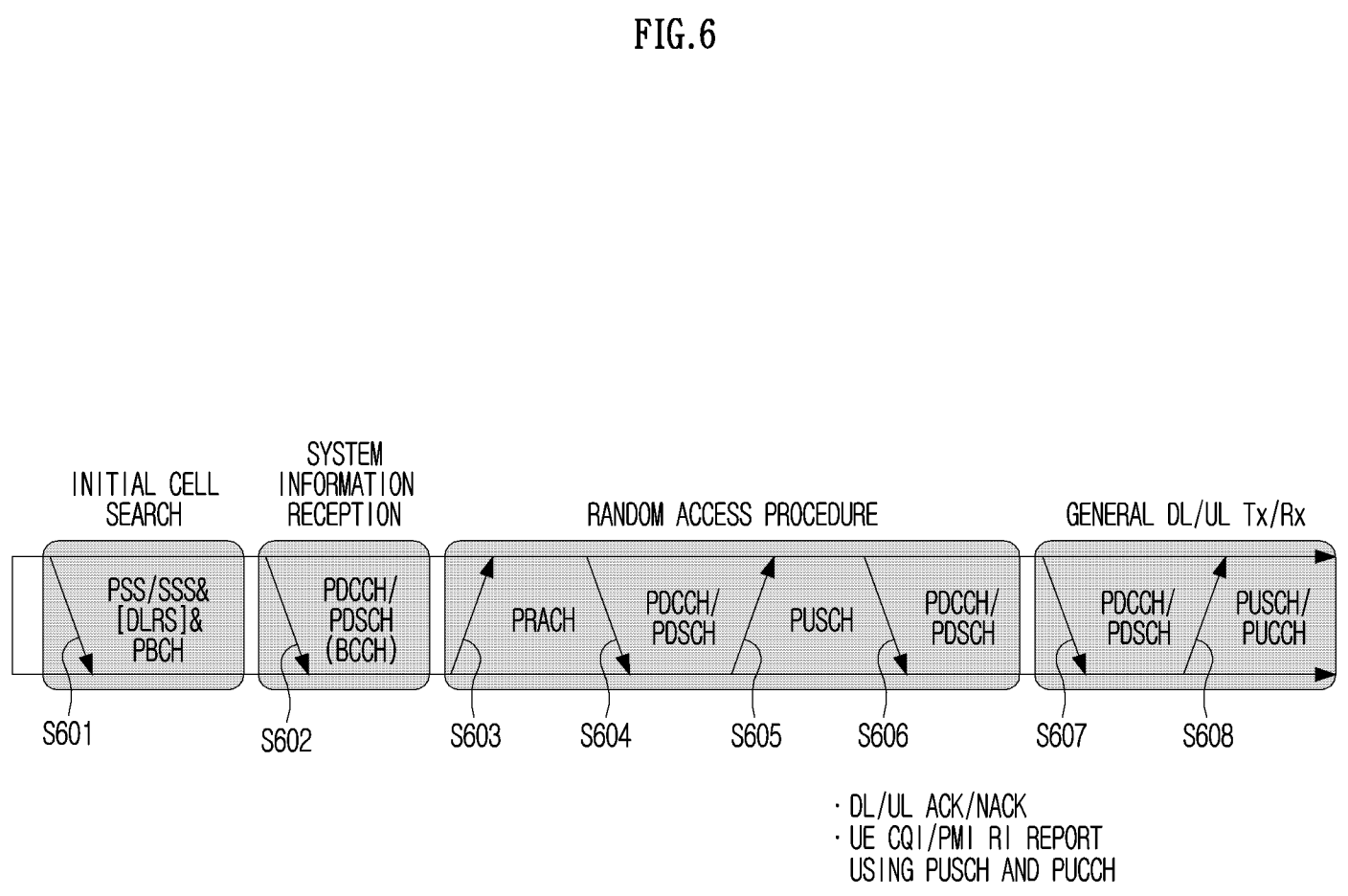

INITIAL CELL SEARCH
PSS/SSS& [DLRS]& PBCH
S601
SYSTEM INFORMATION RECEPTION
PDCCH/ PDSCH (BCCH)
S602
RANDOM ACCESS PROCEDURE
PRACH
S603
PDCCH/ PDSCH
S604
PUSCH
S605
PDCCH/ PDSCH
S606
GENERAL DL/UL Tx/Rx
PDCCH/ PDSCH
S607
PUSCH/ PUCCH
S608

· DL/UL ACK/NACK
· UE CQI/PMI RI REPORT USING PUSCH AND PUCCH

FIG.7

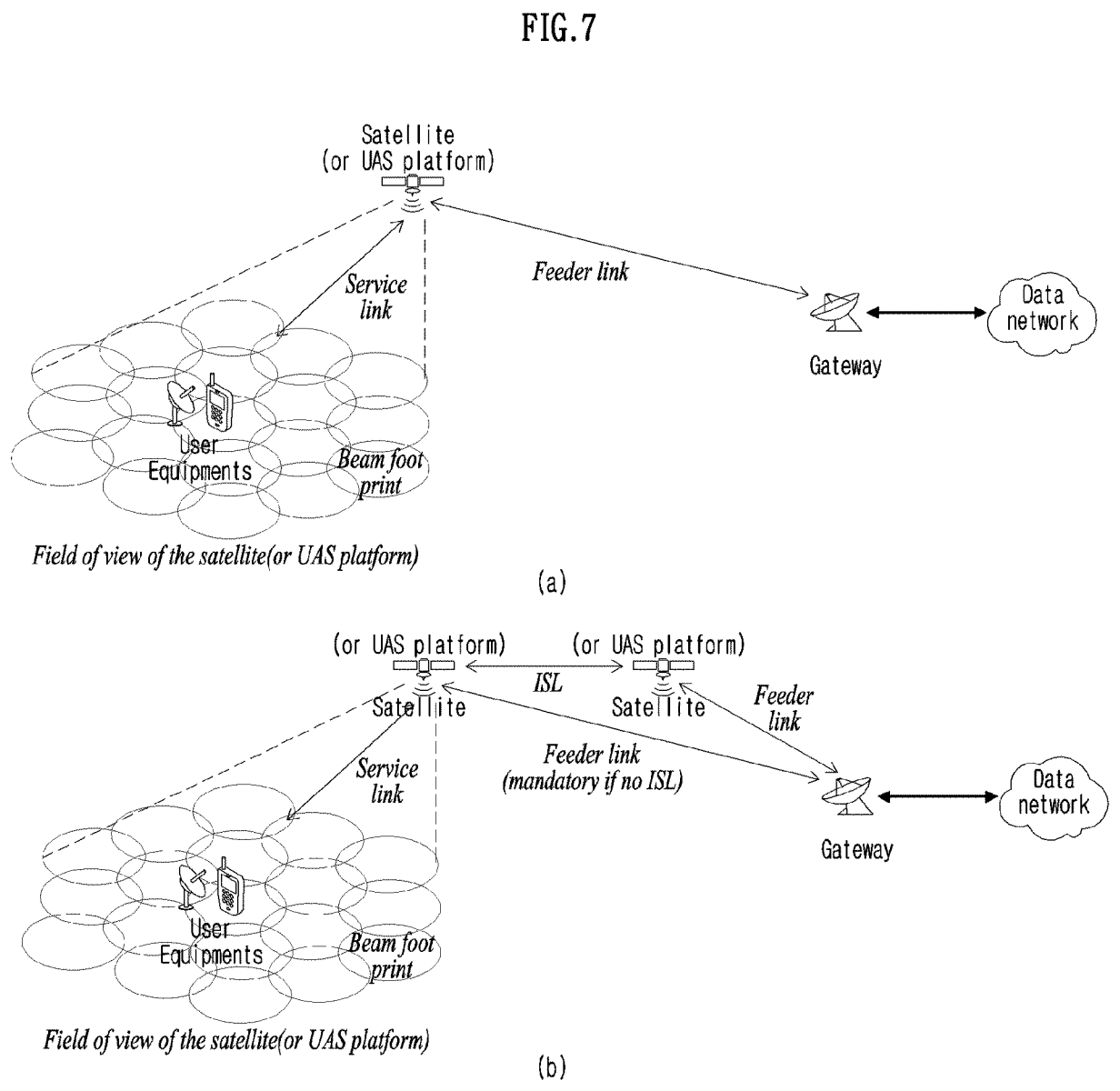

Satellite (or UAS platform)

Feeder link

Gateway

Data network

Service link

Beam foot print

User Equipments

Field of view of the satellite(or UAS platform)

(a)

Satellite (or UAS platform)

ISL

Satellite (or UAS platform)

Feeder link

Feeder link (mandatory if no ISL)

Gateway

Data network

Service link

Beam foot print

User Equipments

Field of view of the satellite(or UAS platform)

(b)

FIG.8
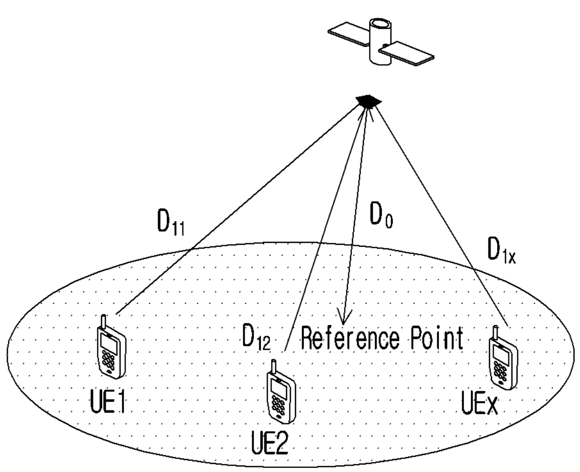
- Common TA(Tcom) = $2*D_0/c$
- UE specific differential TA for xth UE ($T_{UEx}$) = $2*(D_{1x}-D_0)/c$
- Full TA(Tfull) = Tcom + $T_{UEx}$
(a) Regenerative payload
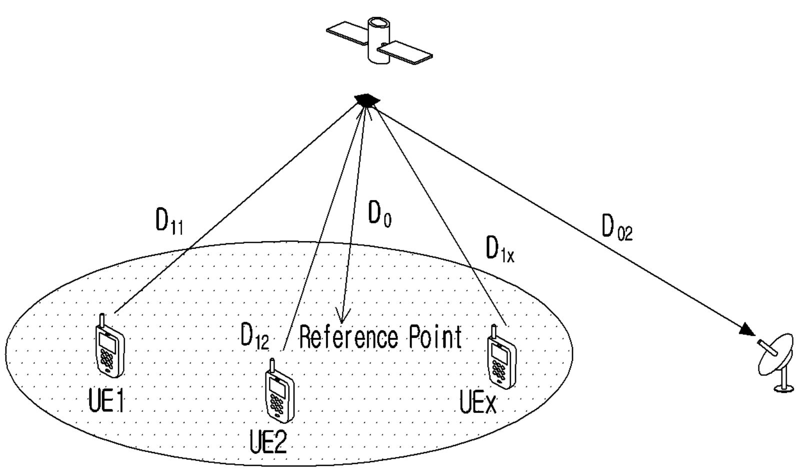
- Common TA(Tcom) = $2*(D_{01}+D_{02})/c$
- UE specific differential TA for xth UE ($T_{UEx}$) = $2*(D_{1x}-D_{01})/c$
- Full TA(Tfull) = Tcom + $T_{UEx}$
(b)Transparent payload FIG.11
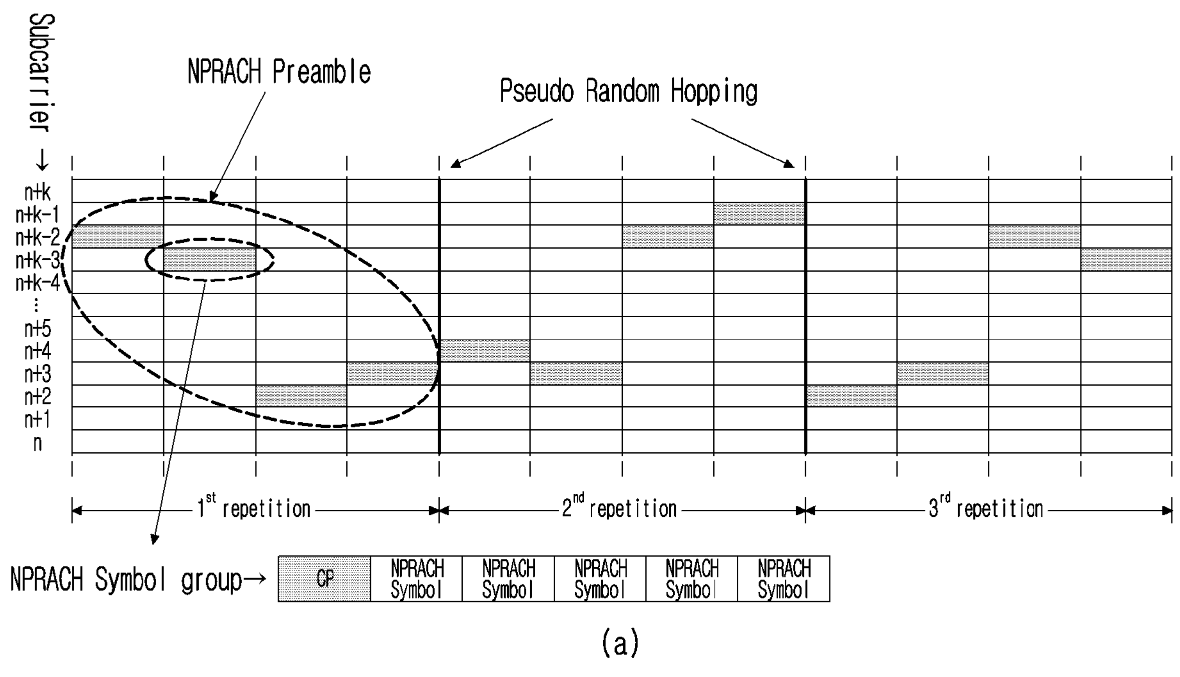
(a)
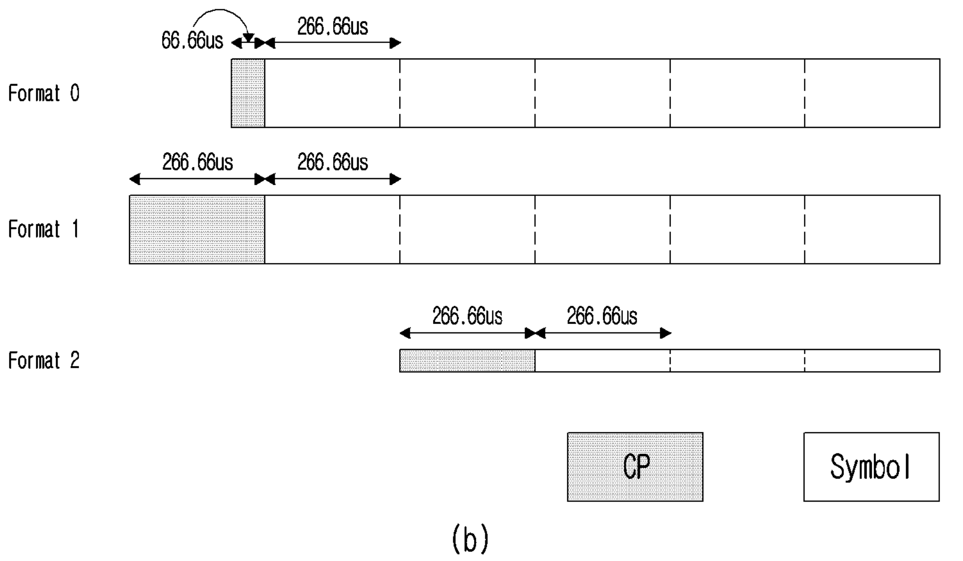
(b)

FIG. 12

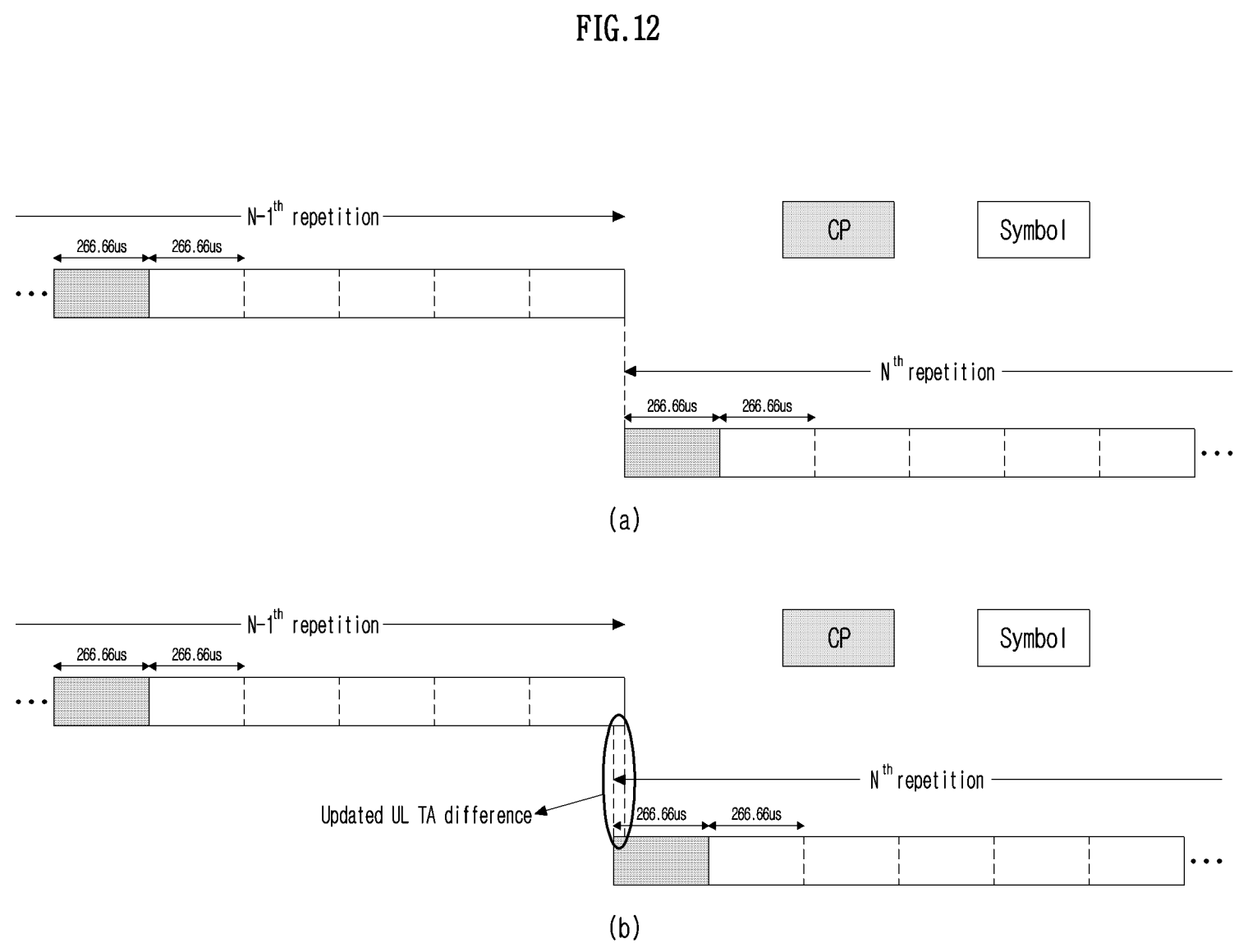

CP
Symbol
N-1th repetition
Nth repetition
266.66us
266.66us
266.66us
266.66us
(a)

CP
Symbol
N-1th repetition
Nth repetition
266.66us
266.66us
266.66us
266.66us
Updated UL TA difference
(b)

METHOD AND DEVICE FOR UPLINK TRANSMISSION AND RECEPTION IN WIRELESS COMMUNICATION SYSTEM

CROSS-REFERENCE TO RELATED APPLICATIONS

This application is a National Stage application under 35 U.S.C. § 371 of International Application No. PCT/KR2022/007924, filed on Jun. 3, 2022, which claims the benefit of Korean Application No. 10-2021-0075915, filed on Jun. 11, 2021. The disclosures of the prior applications are incorporated by reference in their entirety.

TECHNICAL FIELD

The present disclosure relates to a wireless communication system, and in more detail, relates to a method and a device of applying a time reference applied to uplink transmission or reception in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a method and a device of transmitting or receiving an uplink in a wireless communication system.

An additional technical problem of the present disclosure is to provide a method and a device of adjusting a time reference applied to uplink transmission or reception in a wireless communication system including a non-terrestrial network (NTN).

The technical objects to be achieved by the present disclosure are not limited to the above-described technical objects, and other technical objects which are not described herein will be clearly understood by those skilled in the pertinent art from the following description.

A method and device for uplink transmission and reception in a wireless communication system according to an aspect of the present disclosure are disclosed. A method for performing uplink transmission by a terminal in a wireless communication system according to an embodiment of the present disclosure may comprise the steps of: receiving first information about a satellite orbit, second information about a common timing advance (TA), and third information related to a TA update cycle from a base station; calculating a first TA on the basis of the first information and the second information; performing a first uplink transmission on the basis of the first TA; updating the first TA to a second TA at a specific time point based on the third information; and performing a second uplink transmission on the basis of the second TA, wherein the TA update cycle is configured on the basis of a value of 2^n, and the n is a positive integer including 0.

A method of receiving uplink transmission by a base station in a wireless communication system according to an additional aspect of the present disclosure may comprise: transmitting, to a terminal, first information on a satellite orbit, second information on a common Timing Advance (TA), and third information on a TA update period; receiving, from the terminal, a first uplink transmission to which a first TA based on the first information and the second information is applied; and receiving, from the terminal, a second uplink transmission to which a second TA updated at a specific timing based on the third information is applied, wherein the TA update period is configured based on a 2^n value, where n is a positive integer including 0.

According to the present disclosure, a method and a device of transmitting or receiving an uplink in a wireless communication system may be provided.

According to the present disclosure, in a wireless communication system including a non-terrestrial network (NTN), a method and a device of applying a time reference applied to uplink transmission or reception may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 7 is a diagram for describing a NTN supported by a wireless communication system to which the present disclosure may be applied.

FIG. 8 is a diagram for describing a TA in a NTN supported by a wireless communication system to which the present disclosure may be applied.

FIG. 11 is a diagram illustrating the NPRACH preamble supported by a wireless communication system to which the present disclosure may be applied.

FIG. 12 is a diagram illustrating uplink transmission supported by a wireless communication system to which the present disclosure may be applied.

DETAILED DESCRIPTION

Figure 1:
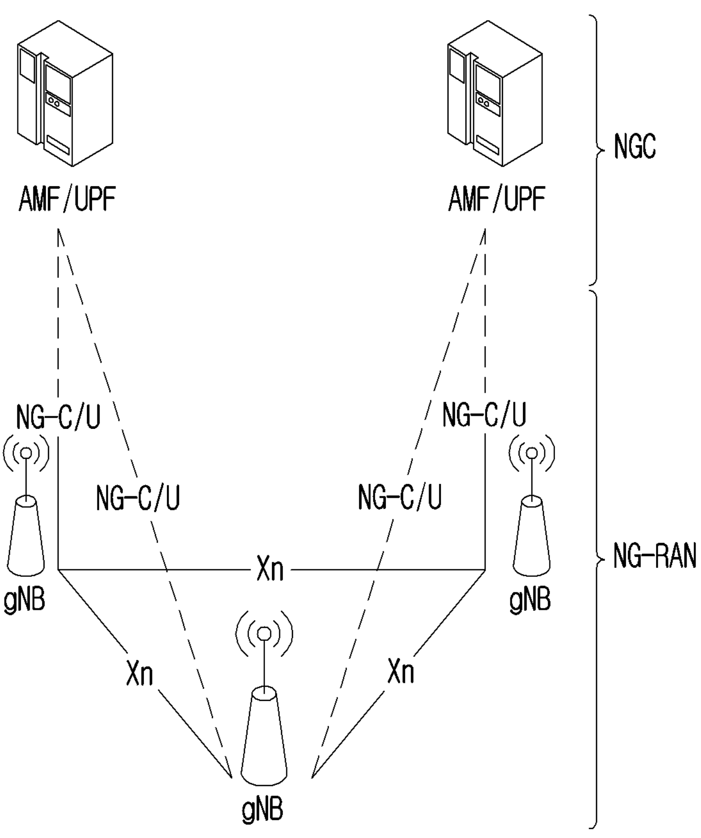
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management

CQI: Channel Quality Indicator

CRI: channel state information-reference signal resource indicator

CSI: channel state information

CSI-IM: channel state information-interference measurement

CSI-RS: channel state information-reference signal

DMRS: demodulation reference signal

FDM: frequency division multiplexing

FFT: fast Fourier transform

IFDMA: interleaved frequency division multiple access

IFFT: inverse fast Fourier transform

L1-RSRP: Layer 1 reference signal received power

L1-RSRQ: Layer 1 reference signal received quality

MAC: medium access control

NZP: non-zero power

OFDM: orthogonal frequency division multiplexing

PDCCH: physical downlink control channel

PDSCH: physical downlink shared channel

PMI: precoding matrix indicator

RE: resource element

RI: Rank indicator

RRC: radio resource control

RSSI: received signal strength indicator

Rx: Reception

QCL: quasi co-location

SINR: signal to interference and noise ratio

SSB (or SS/PBCH block): Synchronization signal block (including PSS (primary synchronization signal), SSS (secondary synchronization signal) and PBCH (physical broadcast channel))

TDM: time division multiplexing

TRP: transmission and reception point

TRS: tracking reference signal

Tx: transmission

UE: user equipment

ZP: zero power

Overall System

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
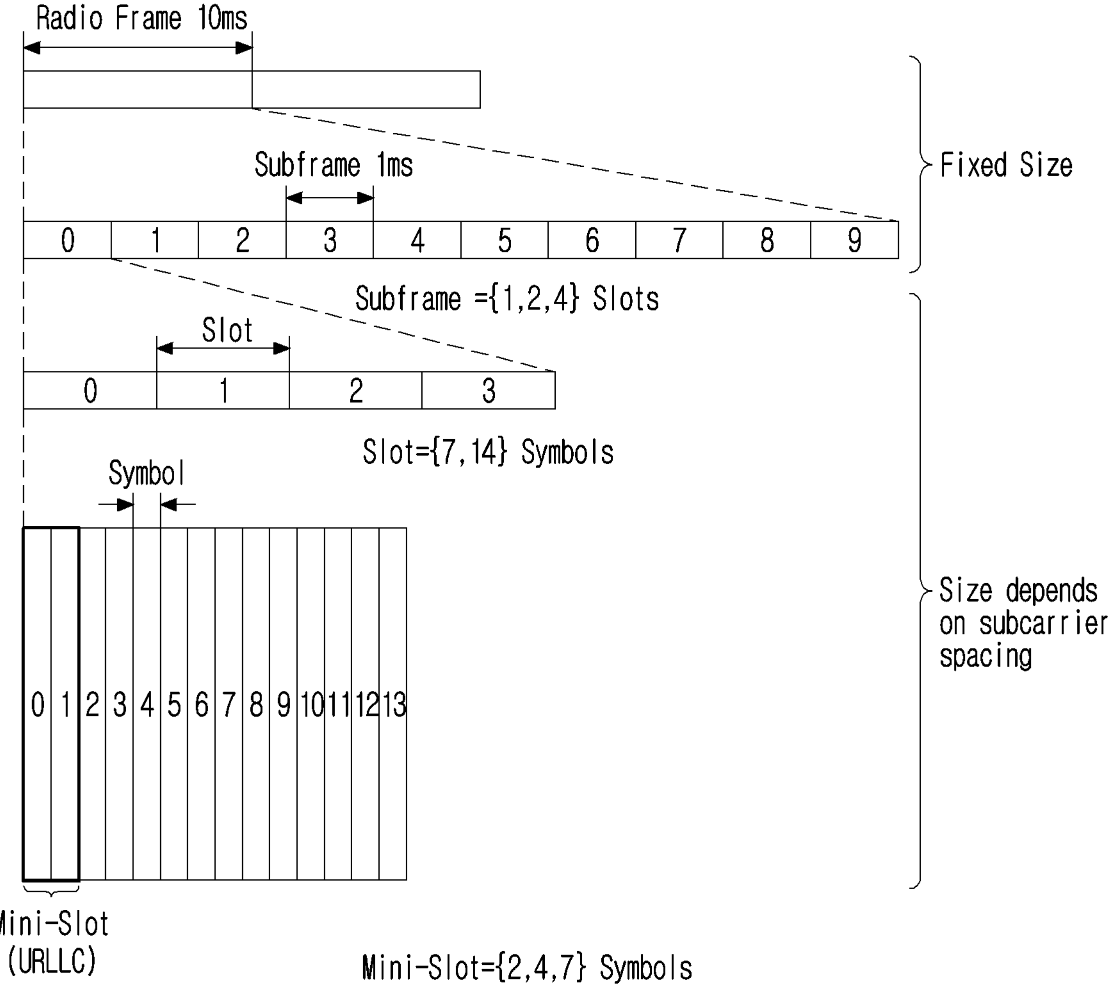
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |

TABLE 1-continued

| μ | Δf = $2^{\mu}$ · 15 [kHz] | CP |
|---|---|---|
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
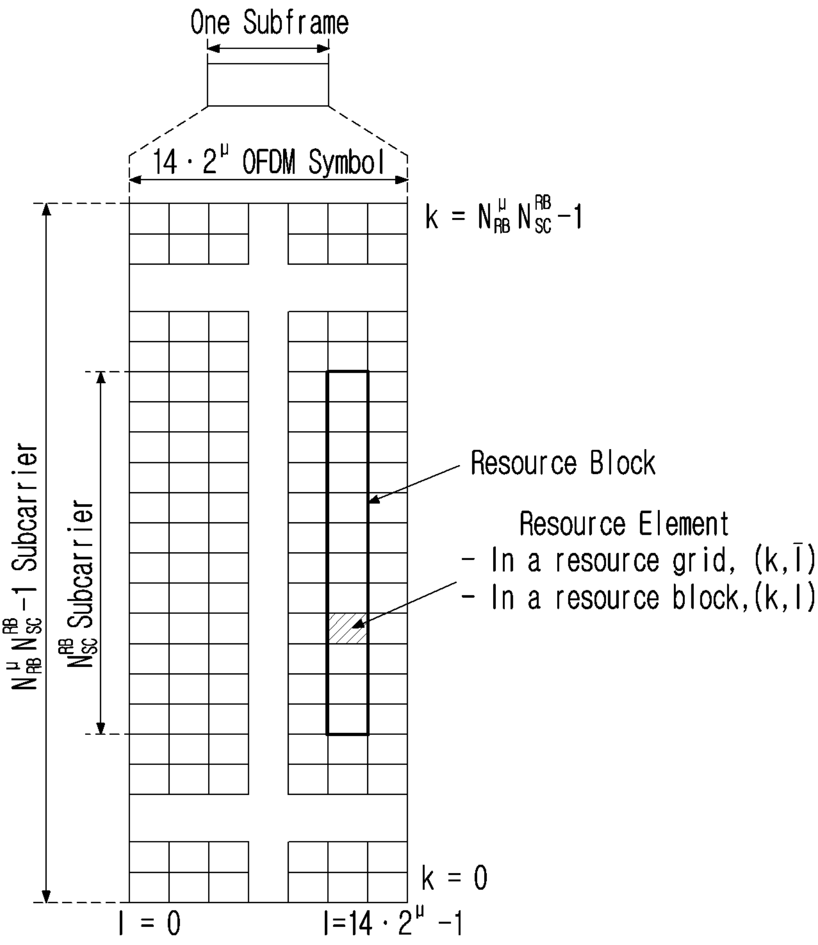
FIG. 3 illustrates a resource grid in a wireless communication system to which the present disclosure may be applied.

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing. FIG. 3 illustrates a resource grid in a wireless communication system to which the present disclosure may be applied. In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \le N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^{\mu} N_{sc}^{RB}-1$ is an index in a frequency domain and $l'=0, \ldots, 2^{\mu} N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
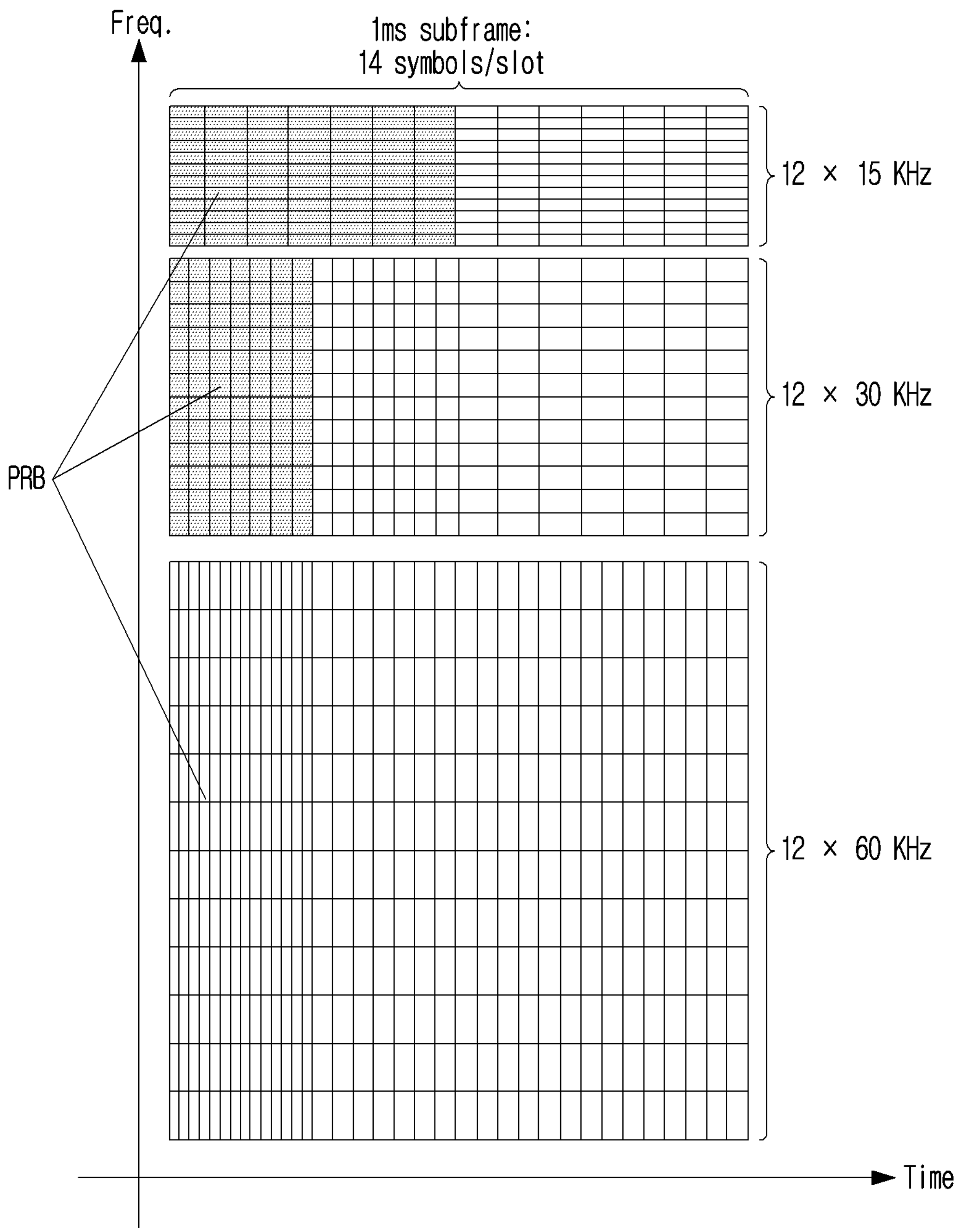
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
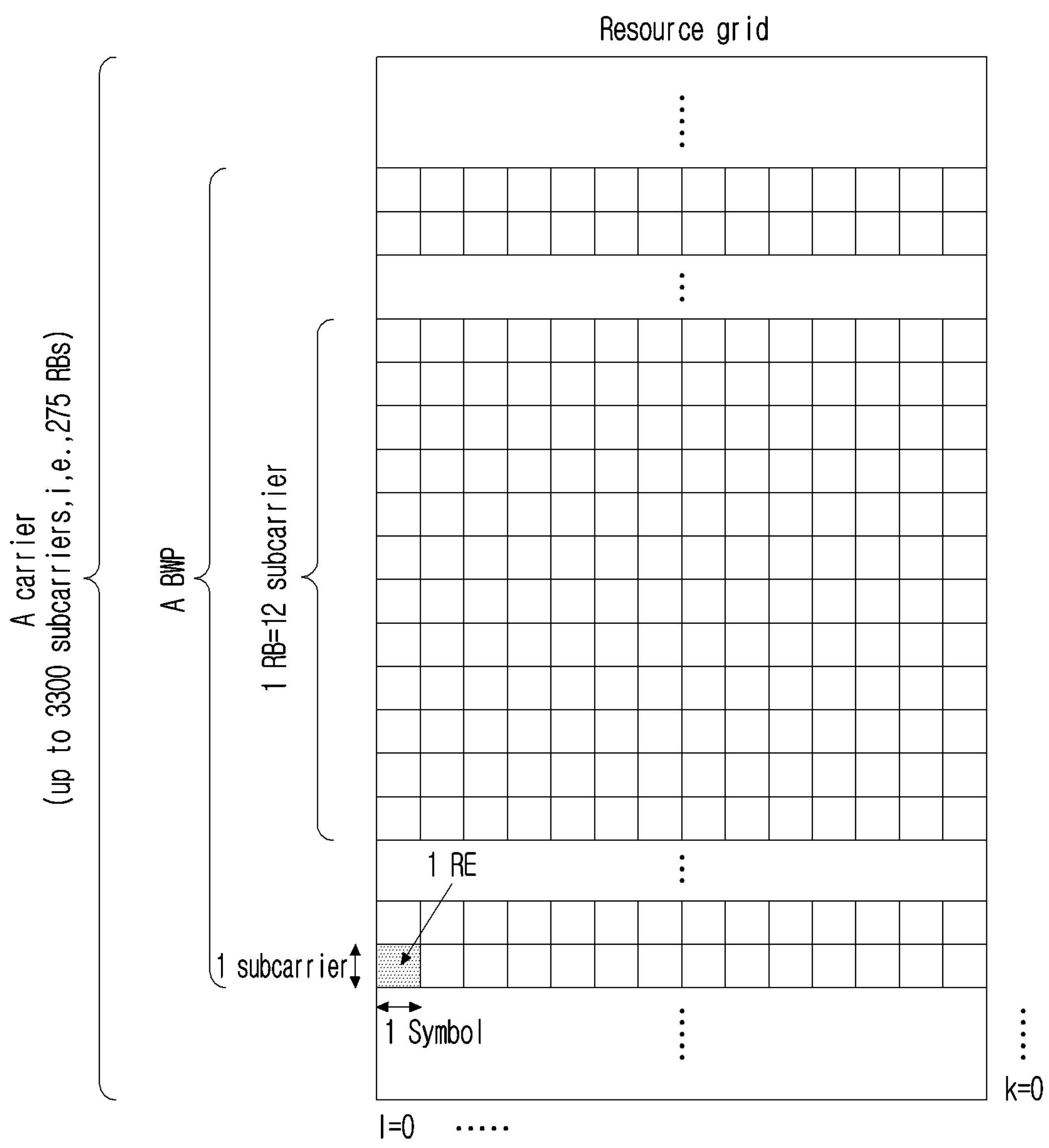
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation and Coding Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted. DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted. DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Wireless Communication System Supporting Non-Terrestrial Network (NTN)

A NTN refers to a segment of a network or a network configured to use a radio resource (RF resource) in an unmanned aircraft system (UAS) platform or a satellite. In order to secure a wider coverage or provide a wireless communication service in a place where it is not easy to install a wireless communication base station, use of a NTN service is considered.

Here, a NTN service refers to providing a wireless communication service to terminals by installing a base station on an artificial satellite (e.g., a geostationary-orbit, low-orbit, medium-orbit satellite, etc.), an airplane, an unmanned airship, a drone, etc., not on the ground. In the following description, a NTN service may include a NR NTN service and/or a LTE NTN service. A terrestrial network (TN) service refers to providing a wireless communication service to terminals by installing a base station on the ground.

A frequency band considered for a NTN service may be mainly a 2 GHz band (S-band:2-4 GHz) in a first frequency range (frequency range 1, FR1) (e.g., 410 MHz to 7.125 GHz) and a downlink 20 GHz, uplink 30 GHz band (Ka-Band: 26.5~40 GHz)) in a second frequency range (frequency range 2, FR2) (e.g., 24.25 GHz to 52.6 GHz). Additionally, a NTN service may be also supported in a frequency band between 7.125 GHz and 24.25 GHz or in a frequency band equal to or greater than 52.6 GHz.

FIG. 7 is a diagram for describing a NTN supported by a wireless communication system to which the present disclosure may be applied.

FIG. 7(*a*) illustrates a NTN scenario based on a transparent payload and FIG. 7(*b*) illustrates a NTN scenario based on a regenerative payload.

Here, a NTN scenario based on a transparent payload is a scenario that an artificial satellite receiving a payload from a base station on the ground transmits a corresponding payload to a terminal and a NTN scenario based on a regenerative payload refers to a scenario that an artificial satellite is implemented as a base station (gNB).

A NTN is generally characterized by the following elements.

At least one sat-gateway for connecting a NTN to a common data network:

A geostationary earth orbiting (GEO) satellite is supplied by at least one sat-gateway arranged in a coverage targeted by a satellite (e.g., a regional or continental coverage). It may be assumed that a terminal in a cell is served by only one sat-gateway.

A non-GEO satellite may be successively served by at least one sat-gateway. In this case, a wireless communication system guarantees service and feeder link continuity between serving sat-gateways during a time duration enough to perform mobility anchoring and handover.

Feeder link or radio link between a sat-gateway and a satellite (or a UAS platform)

Service link or radio link between a terminal and a satellite (or a UAS platform)

Satellite (or UAS platform) which may implement one of a transparent or regenerative payload (including on-board processing)

Satellite (or UAS platform) generation beams generally generate a plurality of beams in a service region where a boundary is designated by a view of a satellite (or a UAS platform). A footprint of a beam is generally elliptical. A view of a satellite (or a UAS platform) is determined by an on-board antenna diagram and a minimum altitude angle.

Transparent payload: Radio frequency filtering, frequency conversion and amplification. Accordingly, a waveform signal repeated by a payload is not changed.

Regenerative payload: Demodulation/decoding, switching and/or routing, coding/modulation as well as radio frequency filtering, frequency conversion and amplification. It is substantially the same as having all or part of base station functions (e.g., gNB) in a satellite (or a UAS platform).

For a satellite group, ISL (Inter-satellite links). For it, a regenerative payload is required for a satellite. ISLs may operate in a RF frequency or a broadband.

A terminal is serviced by a satellite (or a UAS platform) in a target service region.

Table 6 illustrates types of a satellite (or a UAS platform).

TABLE 6

| Platform | Altitudinal Range | Orbit | General Beam Footprint Size |
|---|---|---|---|
| Low-earth Orbiting Satellite | 300-1500 km | Circular around the Earth | 100-1000 km |
| Medium-earch Orbiting Satellite | 7000-25000 km | | 100-1000 km |
| Geostationary Earth Orbiting Satellite | 35,786 km | Notional Station which maintains a fixed position at an altitude/azimuth for a given earth point | 200-3500 km |
| UAS Platform (including HAPS) | 8-50 km (20 km for HAPS) | | 5-200 km |
| High Elliptical Orbiting Satellite | 400-50000 km | Elliptical around the Earth | 200-3500 km |

Generally, a GEO satellite and a UAS are used to provide a continental, regional or local service. And, a constellation of LEO (low earth orbiting) and MEO (medium earth orbiting) is used to provide a service in both the northern hemisphere and the southern hemisphere. Alternatively, a corresponding constellation may provide a global coverage including a polar region. Subsequently, a proper orbital inclination, a generated sufficient beam and an inter-satellite link may be required. And, a HEO (Highly Elliptical Orbiting) satellite system may be also considered.

Hereinafter, a wireless communication system in a NTN including the following 6 reference scenarios is described.

Circular orbit and notational station keeping up platform

Highest RTD (Round Trip Delay) constraint

Highest Doppler Constraint

Transparent or regenerative payload

1 ISL Case and 1 Case without a ISL For an inter-satellite link, regenerative payload The following 6 reference scenarios are considered in Table 7 and Table 8.

TABLE 7

| | Transparent Satellite | Regenerative Satellite |
|---|---|---|
| GEO-based Non-terrestrial Access Network | Scenario A | Scenario B |
| LEO-based Non-terrestrial Access Network: Steerable Beams | Scenario C1 | Scenario D1 |
| LEO-based Non-terrestrial Access Network: Corresponding beams move with a satellite. | Scenario C2 | Scenario D2 |

TABLE 8

| Scenario | GEO-based Non-terrestrial Access Network (Scenario A and B) | LEO-based Non-terrestrial Access Network (Scenario C and D) |
|---|---|---|
| Orbit Type | Notional Station which maintains a fixed position at an altitude/azimuth for a given earth point | Circular around the Earth |
| Altitude | 35,786 km | 600 km, 1,200 km |
| Spectrum (Service Link) | In FR1 (e.g., 2 GHz)<br>In FR2 (e.g., DL 20 GHz, UL 30 GHz) | |
| Maximum Channel Bandwidth Capability (Service Link) | In FR1, 30 MHz<br>In FR2, 1 GHz | |

TABLE 8-continued

| Scenario | GEO-based Non-terrestrial Access Network (Scenario A and B) | LEO-based Non-terrestrial Access Network (Scenario C and D) |
|---|---|---|
| Payload | Scenario A: Transparent (including only a radio frequency function) Scenario B: Regenerative (including all or part of RAN functions) | Scenario C: Transparent (including only a radio frequency function) Scenario D: Regenerative (including all or part of RAN functions) |
| Inter-satellite Link | No | Scenario C: No Scenario D: Yes/No (Both two cases are available) |
| Earth-fixed Beam | Yes | Scenario C1: Yes (Steerable Beams)(Reference 1), Scenario C2: No (Corresponding beams move with a satellite) Scenario D1: Yes (Steerable Beams)(Reference 1), Scenario D2: No (Corresponding beams move with a satellite) |
| Maximum Beam Footprint Size (edge-to-edge) irrelevant to Elevation Angle | 3500 km (Reference 5) | 1000 km |
| Minimum Elevation Angle for both Sat-Gateway and Terminal | 10° for Service Link 10° for Feeder Link | 10° for Service Link 10° for Feeder Link |
| Maximum Distance between Satellite and Terminal at Minimum Elevation Angle | 40581 km | 1,932 km (Altitude of 600 km) 3,131 km (Altitude of 1,200 km) |
| Maximum Round Trip Delay (only Propagation Delay) | Scenario A: 541.46 ms (Service and Feeder Link) Scenario B: 270.73 ms (only Service Link) | Scenario C: (Transparent Payload: Service and Feeder Link) 25.77 ms (600 km) 41.77 ms (1200 km) Scenario D: (Regenerative Payload: Only Service Link) 12.89 ms (600 km) 20.89 ms (1200 km) |
| Maximum Differential Delay in Cell (Reference 6) | 10.3 ms | For each of 600 km and 1200 km, 3.12 ms and 3.18 ms |
| Maximum Doppler Shift (Earth-fixed Terminal) | 0.93 ppm | 24 ppm (600 km)21 ppm (1200 km) |
| Maximum Doppler Shift Variation (Earth-fixed Terminal) | 0.000 045 ppm/s | 0.27 ppm/s (600 km)0.13 ppm/s (1200 km) |
| Movement of Terminal on the Earth | 1200 km/h (e.g., Aircraft) | 500 km/h (e.g., High-speed Train), Possible 1200 km/h (e.g., Aircraft) |
| Terminal Antenna Type | Omnidirectional Antenna (Linear Polarization), Assumed to be 0 dBi Directional Antenna (Aperture Diameter of up to 60 cm in Circular Polarization) | |
| Terminal Transmission (Tx) Power | Omnidirectional Antenna UE Power Class 3 Directional Antenna of up to 200 mW: Up to 20 W | |
| Terminal Noise Level | Omnidirectional Antenna: 7 dB Directional Antenna: 1.2 dB | |
| Service Link | Link defined in 3GPP | |
| Feeder Link | Radio Interface defined in 3GPP or non-3GPP | Radio Interface defined in 3GPP or non-3GPP |

Reference 1: Each satellite may use a beamforming technology to steer a beam to a fixed point on earth. It is applied for a time corresponding to a visibility time of a satellite. Reference 2: The maximum delay variation in a beam (a terminal fixed on earth (or on the ground)) is calculated based on the minimum elevation angle for both a gateway and a terminal.

Reference 3: The maximum differential delay in a beam is calculated based on a diameter of the maximum beam reception scope at nadir.

Reference 4: Speed of light used for delay calculation is 299792458 m/s.

Reference 5: A size of the maximum beam reception scope of GEO is determined based on a GEO high throughput system technology of a current state by assuming that there is a spot beam at a coverage edge (low altitude).

Reference 6: The maximum differential delay at a cell level is calculated by considering a delay at a beam level for the largest beam size. When a beam size is small or medium, a cell may include at least two beams. But, a cumulative differential delay of all beams in a cell does not exceed the maximum differential delay at a cell level of Table 8.

In addition, the following describes a wireless communication system in IoT NTN, including the following five reference scenarios.

GEO and LEO orbital scenarios

No inter-satellite link

Transparent payload

Beam footprint on the ground or fixed due to a fixed or adjustable beam, respectively.

Band of interest below 6 GHz

The above five reference scenarios are considered in Table 9.

TABLE 9

| | Transparent satellite |
|---|---|
| GEO based non-terrestrial access network | Scenario A |
| LEO based non-terrestrial access network generating steerable beams | Scenario B |
| LEO based non-terrestrial access network generating fixed beams whose footprints move with the satellite | Scenario C |
| MEO based non-terrestrial access network generating fixed beams whose footprints move with the satellite | Scenario D |

A NTN-related description in the present disclosure may be applied to a NTN GEO scenario and all NGSO (non-geostationary orbit) scenarios having a circular orbit with an altitude of 600 km or more.

And, the description (a NR frame structure, a NTN, etc.) may be applied in combination of methods which will be described later, and may be supplemented to clarify a technical characteristic of a method described in the present disclosure.

Method of Configuring TA (Timing Advance) Value in NTN

In a TN, a terminal moves in a cell, so although a distance between a base station and a terminal changes, a PRACH preamble transmitted by a terminal may be transmitted to a base station within a time duration of a specific RO (RACH occasion).

And, a TA value for transmitting an uplink signal/channel by a terminal may be configured with an initial TA value and a TA offset value. Here, an initial TA value and a TA offset value may be indicated by a base station as a TA value which may be expressed in a cell coverage scope of a base station.

In another example, when a base station indicates a PDCCH order through DCI, a terminal may transmit a PRACH preamble to a base station. A terminal may transmit an uplink signal/channel to a base station by using a TA value (i.e., an initial TA value) indicated through a response message for a preamble received from a base station (random access response, RAR).

In a NTN, a distance between a satellite and a terminal is changed by movement of a satellite regardless of movement of a terminal. In order to overcome it, a terminal may figure out a position of a terminal through a GNSS (global navigation satellite system) and calculate a UE-specific TA, a round trip delay (RTD) between a terminal and a satellite, through orbit information of a satellite indicated by a base station.

Here, a UE-specific TA, when a PRACH preamble is transmitted at a RO selected by a terminal, may be configured so that a satellite (or a base station (gNB)) may receive a PRACH preamble within a time duration of the RO.

And, when only a UE-specific TA is applied when a PRACH preamble is transmitted at a RO selected by a terminal, the PRACH preamble may be delayed from a reference time of the RO and transmitted to a satellite (or gNB). In this case, an initial TA value indicated by a RAR received from a base station may indicate the delayed value.

Additionally, a common TA may refer to a RTD between a satellite and gNB (or a reference point) on the ground. Here, a reference point may refer to a place where a downlink and uplink frame boundary matches. And, a common TA may be defined as being indicated by a base station to a terminal. If a reference point is in a satellite, a common TA may not be indicated and if a reference point is in gNB on the ground, a common TA may be used to compensate a RTD between a satellite and gNB.

Additionally, in a NTN, a TA value before transmission of message (Msg) 1 (e.g., a PRACH preamble)/Msg A (a PRACH preamble and a PUSCH) may be configured as a UE-specific TA and a common TA (if provided). Here, a UE-specific TA, as described above, may be a RTD between a satellite and a terminal calculated by a terminal itself.

As an embodiment of the present disclosure, FIG. 8 illustrates a method of calculating a TA value in a wireless communication system supporting a NTN.

FIG. 8(*a*) illustrates a regenerative payload-based NTN scenario. A common TA (Tcom) (common to all terminals) may be calculated by 2D0 (a distance between a satellite and a reference signal)/c and a UE-specific differential TA (TUEx) for a x-th terminal (UEx) may be calculated by 2(D1x−D0)/c. The Total TA (Tfull) may be calculated by 'Tcom+TUEx'. Here, D1x may refer to a distance between a satellite and UEx. Here, c may represent speed of light.

FIG. 8(*b*) illustrates a transparent payload-based NTN scenario. A common TA (Tcom) (common to all terminals) may be calculated by 2(D01+D02)/c and a UE-specific differential TA (TUEx) for a x-th terminal (UEx) may be calculated by 2(D1x−D0)/c. The Total TA (Tfull) may be calculated by 'Tcom+TUEx'. Here, D01 may refer to a distance between a satellite and a reference point and D02 may refer to a distance between a satellite and a base station on the ground.

Time Reference Applied to NTN Uplink Transmission or Reception

In the present disclosure, examples of time reference related to uplink transmission of the NTN terminal and uplink reception of the base station are described.

In the present disclosure, a time reference parameter may include a timing advance (TA) parameter. The TA parameter may include a TA command (TAC). Additionally or alternatively, a TA parameter may include at least one of a common TA parameter or a UE-specific TA parameter. In other words, unless otherwise limited, a TA parameters in the following description may include at least one of a TAC, a common TA parameter or a UE-specific TA parameter.

A terminal may calculate a TA based on at least one of a TAC, a common TA parameter or a UE-specific TA parameter. A terminal may determine uplink transmission timing based on a calculated TA.

Figure 9:
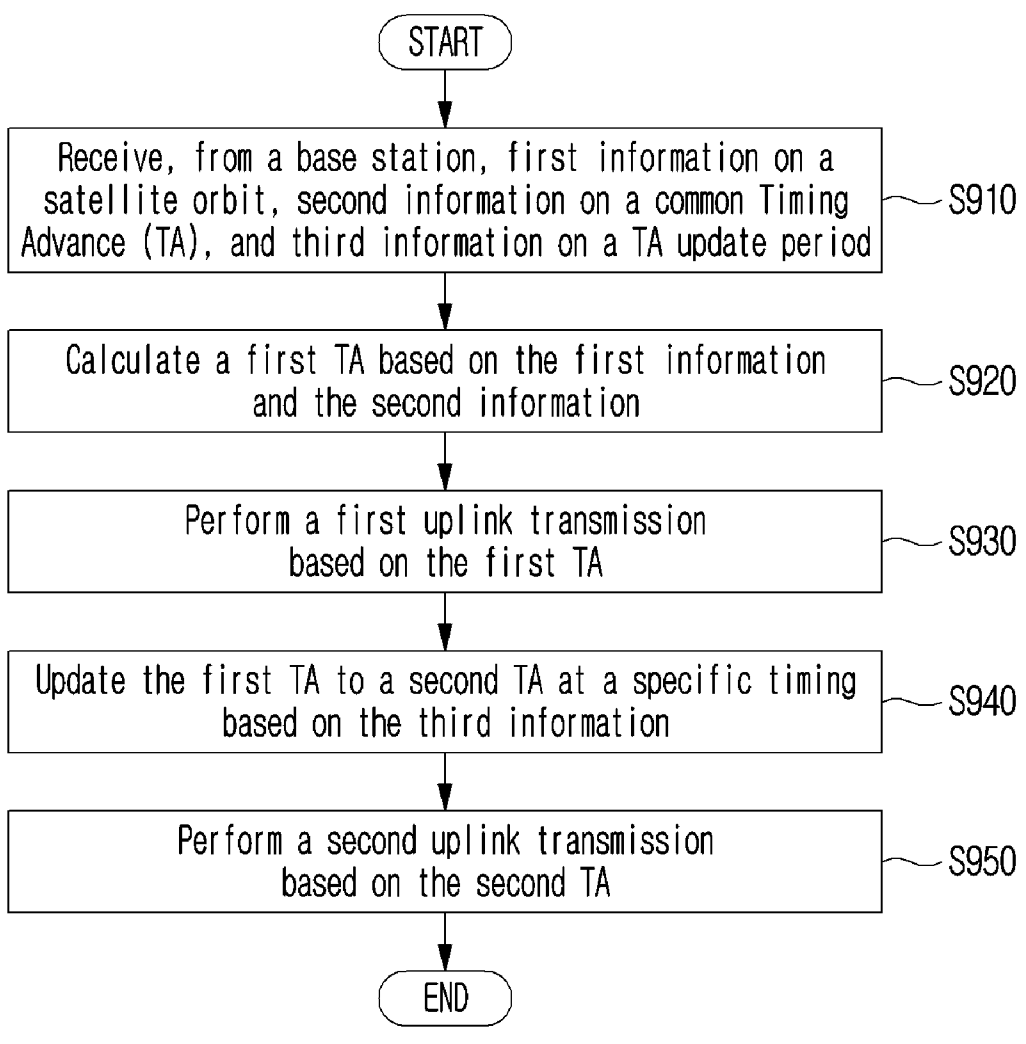
FIG. 9 is a flowchart for describing uplink transmission of a terminal according to an embodiment of the present disclosure.

FIG. 9 is a flowchart illustrating uplink transmission of a terminal according to an embodiment of the present disclosure.

In step S910, the terminal may receive first information on the satellite orbit, second information on the common TA, and third information related to the TA update period from the base station.

For example, in step S910, first information, second information, and third information may be received through higher layer signaling (e.g., system information block (SIB), RRC signaling, etc.).

Here, the TA update period may refer to a period/cycle in which the terminal estimates and calculates the TA value to be applied to uplink transmission and adjusts or updates the uplink transmission timing. The TA update period may be determined according to various detailed examples of the present disclosure.

Together with step S910 or separately from step S910, the terminal may receive configuration/indication information for a certain time interval related to performing TA update from the base station. Here, the corresponding configuration/indication information may include the size of the certain time interval and whether or not to apply it. The corresponding configuration/indication information may be received through at least one of higher layer signaling (e.g., RRC signaling, MAC CE, etc.) or DCI.

Matters related to the certain time interval may be determined according to various detailed examples of the present disclosure to satisfy a timing error limit related to uplink transmission.

In step S920, the terminal may calculate the first TA based on the first information and the second information.

The calculated first TA may be applied to uplink transmission timing. Applying TA to uplink transmission timing may include performing adjustments/updates to uplink transmission timing.

For example, in step S920, the terminal may calculate a UE-specific TA based on the satellite orbit included in the first information, and may calculate the first TA based on the common TA included in the second information and the calculated UE-specific TA.

In step S930, the terminal may perform the first uplink transmission based on the calculated first TA.

For example, according to various detailed examples of the present disclosure, the first uplink transmission is narrowband-based PRACH preamble transmission, and the PRACH preamble transmission may be repeatedly performed according to a pre-configured number.

In step S940, the terminal may adjust/update the first TA to the second TA at a specific timing based on the third information.

For example, the terminal may identify the timing according to the TA update period configured by the base station and adjust/update the uplink transmission timing by applying new TA information (i.e., second TA) at that timing.

For example, updating the first TA to the second TA may mean updating at least one of the common TA or the UE-specific TA, and an update period of the common TA may be set shorter than an update period of the UE-specific TA.

Matters related to TA adjustment/update may be determined according to various detailed examples of the present disclosure.

For example, the TA update period is configured based on a 2^n value, where n may be a positive integer including 0. Additionally, when the uplink transmission corresponds to NPRACH preamble transmission, the TA update period is determined by the product of the 2^n value and a length of a PRACH preamble, and the length of the PRACH preamble may be configured differently depending on the format of the PRACH preamble. Additionally, the TA update period may be configured based on a type of satellite orbit.

In step S950, the terminal may perform a second uplink transmission based on the adjusted/updated second TA.

Additionally, the terminal may report adjusted/updated time reference information to the base station based on the received/acquired time reference parameters. Alternatively, the terminal may report TA parameters determined by the terminal itself (e.g., UE-specific TA parameters) to the base station.

Figure 10:
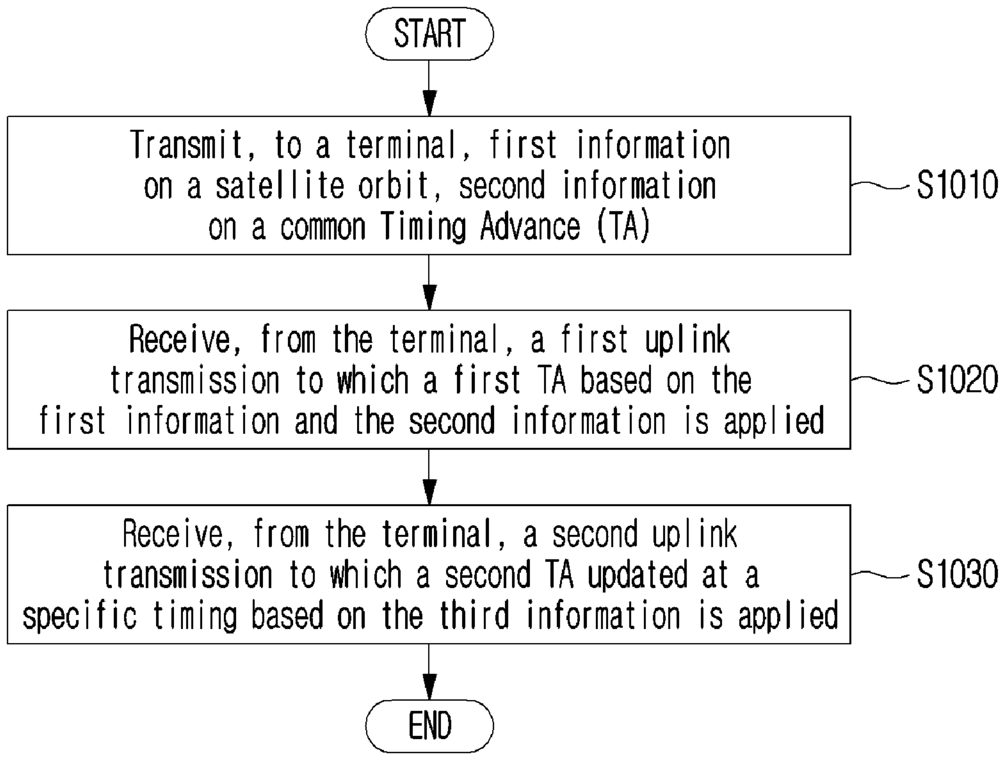
FIG. 10 is a flowchart for describing uplink reception of a base station according to an embodiment of the present disclosure.

FIG. 10 is a flowchart illustrating uplink reception of a base station according to an embodiment of the present disclosure.

In step S1010, the base station may transmit first information on the satellite orbit, second information on the common TA, and third information related to the TA update cycle to the terminal.

In step S1020, the base station may receive the first uplink transmission to which the first TA based on the first information and the second information is applied from the terminal.

In step S1030, the base station may receive a second uplink transmission to which a second TA updated at a specific timing based on the third information is applied from the terminal.

Detailed examples of steps S1010 to S1030 are the same as steps S910 to S950 of FIG. 9, so overlapping descriptions are omitted.

The receiving uplink transmission from the terminal by base station may be based on uplink transmission timing based on TA parameters provided to the terminal by the base station (e.g., TAC and/or common TA parameters) and TA parameters determined by the terminal itself (e.g., UE-specific TA parameters).

In addition, the base station may be provided/receive information on UE-specific TA parameters from the terminal, and be provided/receive information on the overall time reference (e.g., TA) to which the UE-specific TA parameters are applied.

Hereinafter, detailed examples according to the present disclosure will be described.

As described above, the NTN service method may also be applied to a wireless communication system for LTE NB-IoT and/or LTE eMTC. In the LTE NB-IoT and/or LTE eMTC method, for uplink transmission, low-cost terminals may be designed to perform repetitive transmission. At this time, when the NTN service is applied, if the terminal performs multiple repetitive transmissions for uplink transmission, errors regarding the initially configured TA value may accumulate over time.

FIG. 11 is a diagram illustrating the NPRACH preamble supported by a wireless communication system to which the present disclosure may be applied.

Referring to FIG. 11(*a*), in the case of NPRACH format 0/1, the NPRACH preamble may be composed of four symbol groups. Although not shown in FIG. 11, in the case of NPRACH format 2, the NPRACH preamble may consist of 6 symbol groups.

Referring to FIG. 11(*b*), the symbol group of NPRACH format 0/1 may be conposed of 1 cyclic prefix (CP) and 5 symbols, and the symbol group of NPRACH format 2 may be composed of 1 CP and 3 symbols. Here, NPRACH format 0/1 may support subcarrier spacing (SCS) of 3.75 kHz, and NPRACH format 2 may support SCS of 1.25 kHz.

Here, the length of CP may be expressed as T_CP, and the length of the sequence consisting of symbols (i.e., 5 symbols of NPRACH format 0/1 and 3 symbols of NPRACH format 2) may be expressed as T_SEQ. That is, the symbol group constituting the NPRACH preamble may be expressed as the sum of T_CP and T_SEQ, and the NPRACH preamble may be expressed as a multiple of the sum of T_CP and T_SEQ.

As shown in FIG. 11, in the case of LTE NB-IoT PRACH (i.e., NPRACH), in an FDD situation, the terminal may be configured to transmit repeatedly the NPRACH preamble (e.g., 5.6 ms or 6.4 ms for each NPRACH preamble format) up to 128 times (i.e., 716.8 ms to 819.2 ms). For example, in relation to LTE NB-IoT PRACH transmission, after transmitting the NPRACH preamble repeatedly 64 times, the a frequency/time Drift may be corrected by configuring/defining a certain time interval (hereinafter referred to as timing gap) (e.g. 40 ms). In this case, the terminal may correct frequency/timing drift by receiving at least one of DL RS or PSS/SSS in the corresponding timing gap.

However, even if the existing timing gap is used, assuming that the typical timing drift rate of LEO considered in NTN service is 93 us/s, while transmitting the NPRACH preamble repeatedly 64 times, an error of 33.33 us ((64*5.6 ms)*93 us/s) or 38.09 us ((64*6.4 ms)*93 us/s) may occur. In this case, a problem occurs in which the error does not satisfy the previously required timing error limit (e.g., 80*Ts=2.6 us).

Therefore, in order to solve this problem, examples of introducing a new timing gap (i.e., uplink timing gap) (hereinafter, Embodiment 1), examples of solving the problem through other methods instead of introducing a new timing gap (hereinafter, Embodiment 2) and detailed configuration examples in the case of changing the TA for uplink transmission of the terminal in the middle of transmission based on the proposed contents (hereinafter, Embodiment 3) will be described below.

The methods related to the RACH procedure, which will be described later, are related to uplink transmission and may be equally applied to the downlink signal transmission method in the NR system or LTE system described above. In addition, of course, it may be modified or replaced to fit the terms, expressions, structures, etc. defined in each system so that the technical idea proposed in this specification may be implemented in the corresponding system.

In addition, the methods proposed in the present invention are explained through NPRACH of the LTE NB-IoT system, but may be similarly applied to other uplink channels (e.g., NPUSCH, NPUCCH, etc.), and may also be applied to the uplink channel of the LTE eMTC system (e.g., PRACH and PUSCH, PUCCH, etc.).

Embodiment 1

In order to satisfy the timing error limit required to support NTN services, a method of introducing a new timing gap that is separate from the existing one is proposed.

In this case, a configuration/indication method for the period and/or size of the new timing gap, a configuration/indication method for the case where the existing timing gap and the new timing gap coexist, and a configuration/indication method for whether or not the new timing gap is applied, and a configuration/indication method for uplink signals and/or channels in which new timing gaps may be introduced, etc. may be considered.

Embodiment 1-1

This embodiment relates to a method of configuring/indicating the period and/or size of a new timing gap in relation to uplink transmission.

When a new timing gap is introduced, it is necessary to configure an appropriate period and/or size of the new timing gap.

Here, the timing gap may refer to a certain time interval in which the terminal may adjust/update the timing for uplink transmission by adjusting/updating the time reference (i.e., TA value) for uplink. Additionally, the period of the timing gap may refer to the period in which the terminal adjusts/updates the timing for uplink transmission by adjusting/updating the time reference (i.e., TA value) for uplink.

At this time, the period of the new timing gap needs to be defined to satisfy the timing error limit described above. That is, considering the maximum time that does not exceed the timing error limit and the minimum repetition unit for each signal and/or channel, the largest repetition number that is less than or equal to the maximum time is determined, and a new timing gap may be defined as existing after transmission of an uplink signal and/or channel for a determined number of repetitions is terminated.

In particular, if the determined number of repetitions is greater than the total number of repetitions of the uplink signal and/or channel configured/indicated by the base station, the terminal may expect that no new timing gap exists. Alternatively, if the determined number of repetitions is less than the total number of repetitions of the uplink signal and/or channel configured/indicated by the base station, the terminal may expect that a new timing gap exists after the transmission of the uplink signal and/or channel corresponding to the number of repetitions is completed each time. At this time, in the case of NPRACH, a new timing gap may be configured to exist by disconnecting each preamble repetition number, and in the case of NPUSCH and/or NPUCCH, a new timing gap may be configured to exist by disconnecting in absolute time (e.g., number of subframes, number of slots, etc.).

As a specific example, as described above, the typical timing drift rate of the fastest moving LED among the satellites considered in the NTN service is 93 us/s, and the existing required timing error limit is 2.6 us (i.e., 80*Ts), so the new timing gap is may be required to exist every period less than or equal to 27.95 ms (i.e., 2.6 us/(93 us/s)).

However, since it may be unnecessary to adjust/update the time reference (i.e. TA value) for uplink too frequently, the period of the timing gap may be determined as the largest integer value or the largest exponent of 2 while being as small as or equal to the calculated value. In other words, the period of the timing gap may be expressed in the form of the product of 2^k (k is a positive integer including 0) and a certain time unit.

For example, the period of the timing gap may be expressed in the form o at least one of 2^k slots, 2^k subframes, 2^k preamble length, 2^k RU (Resource Unit)

length, 2^k (NPRACH) symbol length and 2^k (NPRACH) symbol group length, where k may be a positive integer including 0.

In addition, in the case of NPRACH, the preamble is set as the basic unit of repetition, so considering the preamble size (i.e., preamble length) of NPRACH, a new timing gap may be configured to exist after the NPRACH preamble is transmitted repeatedly N times. For example, for NPRACH format 0/1, a new timing gap may be configured to exist after transmitting N*4*(T_CP+T_SEQ) preambles. Alternatively, for NPRACH format 2, a new timing gap may be configured to exist after transmitting N*6*(T_CP+T_SEQ) preambles. That is, since it corresponds to a length of 5.6 ms or 6.4 ms for each NPRACH format, N may be set to 4 according to specific calculations (i.e., 27.95 ms/5.6 ms=4.9910, 27.95 ms/6.4 ms=4.3671).

Additionally, in the case of NPUSCH, a single RU is set as the basic unit of repetition. For NPUSCH format 1, for 15 kHz single tone transmission, a single RU is 8 subframes (i.e., 8 ms), and for 15 kHz 12 tone transmission, a single RU is 1 subframe (i.e., 1 ms). Therefore, in each case, a new timing gap may be configured to exist after repeatedly transmitting the NPUSCH single RU N times. For example, in the case of 15 kHz single tone transmission, a new timing gap may be configured to exist after repeatedly transmitting a single RU three times (i.e., 27.95 ms/8 ms=3.4936, N=3). For 15 kHz 12 tone transmission, a new timing gap may be configured to exist after repeat transmitting a single RU 27 times (i.e. 27.95 ms/1 ms=27.95, N=27).

Alternatively, since the RU unit of NPUSCH consists of one or more subframes and/or slots, a new timing gap may be defined to exist after an absolute time from the start of the first transmission. For example, a new timing gap may be defined to exist every 27 ms (i.e., 27 subframes or 27*30720 Ts) from the start of NPUSCH transmission. Characteristically, counting from the start of NPUSCH transmission to a specific timing may include the actually transmitted NPUSCH, and can also be configured to include the NPUSCH that has been postponed due to NPRACH, etc.

In the example above, the typical time drift rate in LEO is 93 us/s, it needs to be considered that the value applies to each feeder link and service link. Therefore, it is necessary to consider the period of the new timing gap by setting the time drift rate to 196 us/s, which is twice that of 93 us/s. Accordingly, the new timing gap may be configured to exist every period less than or equal to 13.97 ms (2.6 us/(186 us/s)). Additionally, the proposed methods described above may be similarly applied based on the corresponding value (i.e., 13.97 ms).

The size of the new timing gap may be configured smaller than the existing timing gap (i.e., legacy UL timing gap, 40 ms). Through the new timing gap, the terminal may estimate and calculate a new TA (i.e., UL TA), and then the terminal may adjust the TA to be actually applied and transmit subsequent uplink signals and/or channels. Alternatively, the terminal may calculate a new TA value in advance before initial transmission and perform an operation to adjust the actual TA to be applied to the transmission of the uplink signal and/or channel through the new timing gap. Since this operation is different from the PSS/SSS reception operation performed through the existing timing gap, it may not be necessary to configured it as large as the existing timing gap. Here, the new timing gap may be configured on a slot basis, on a subframe basis, or in absolute time (e.g., ms).

A method of operating on the assumption that a period and/or size of the new timing gap described above is pre-defined in the standard specification and the corresponding information is known in advance between the terminal and the base station may be considered. Alternatively, the base station may consider configuring/indicating information on the period and/or size of the new timing gap described above to the terminal through higher layer signaling (e.g., system information block (SIB), RRC signaling, etc.). In this case, the base station may configure/indicate the corresponding information in a cell-specific method.

Additionally, the period and/or size of the new timing gap may be defined depending on the orbit type of the satellite. If the orbit type of the serving cell and the orbit type of the neighboring cell are the same or similar, the period and/or size of the new timing gap indicated by the serving cell may be configured to maintain the same in the neighboring cell. That is, if the base station does not configure/indicate to the terminal information on the new timing gap for the adjacent cell, the terminal may expect that the information on the new timing gap for the serving cell will be equally applied to the neighboring cell.

When the terminal is configured/indicated to use a new timing gap from the base station, the terminal may be configured to adjust/update the TA at every timing gap and apply the TA to the transmission of subsequent uplink signals and/or channels. When the terminal is not configured/indicated to use the new timing gap from the base station, the size of the new timing gap is configured/indicated to be 0 (or an invalid value), or the period of the new timing gap is infinite (or a invalid value), the terminal may be configured to perform existing LTE NB-IoT/eMTC operations (i.e., operations that do not adjust/update the TA during repeated transmission of uplink signals and/or channels). Alternatively, in these cases, the terminal may be configured to adjust/update the TA using only the existing timing gap.

Additionally, the size of the new timing gap may be configured differently depending on the size of the TA. That is, if the TA value is large, the size of the new timing gap may be set large, and if the TA value is small, the size of the new timing gap may also be set small. Here, the size of the TA may mean the size of the entire TA calculated by adding the terminal-specific TA and the common TA, or the size of each TA (i.e., terminal-specific TA and common TA).

Alternatively, the size of the new timing gap may be configured to change over time. For example, the base station may configure/indicated information on the decrease rate and/or increase rate to change over time, along with the size of the new timing gap. Here, the decrease rate and/or increase rate may be composed of a linear function and/or a second or higher order function. The terminal may be configured to determine the size of the new timing gap that changes with time based on the configured/indicated corresponding information, and to adjust/update the TA through the new timing gap during transmission of the uplink signal and/or channel.

Embodiment 1-2

This embodiment relates to the coexistence of an existing timing gap and a new timing gap in relation to uplink transmission.

In the case of the existing LTE NB-IoT system, a timing gap for the terminal to correct frequency drift and/or time drift by receiving DL RS or PSS/SSS, etc. during transmission of an uplink signal and/or channel. (i.e., the existing timing gap) is defined. For example, an existing timing gap (e.g., an uplink timing gap of 40 ms) is configured to exist after transmitting the preamble repeatedly 64 times for NPRACH format 0/1, and to exist after transmitting the preamble 16 times repeatedly for NPRACH format 2. That is, in the case of NPRACH format 0, an existing timing gap is configured to exist every 358.4 ms (5.6 ms*64) after preamble transmission, and in the case of NPRACH format 1, an existing timing gap is configured to exist every 409.6 ms (6.4 ms*64) after preamble transmission. Additionally, in the case of NPUSCH, the existing timing gap is configured to exist every 256 ms regardless of the NPUSCH format.

Basically, even if a new timing gap is introduced, the existing timing gap may need to be maintained. That is, timing gaps with two different purposes may coexist.

When two timing gaps coexist, the two timing gaps may be defined to be used for different purposes, as described above. In this case, it may be desirable for the TA to be adjusted/updated even when the terminal performs uplink transmission after the existing timing gap. That is, the terminal may configured to perform a newly introduced operation (i.e., an operation of adjusting/updating the TA and applying it to uplink transmission) during a new timing gap, and the terminal may configured to simultaneously or sequentially perform existing operations (i.e., correcting frequency/time drift by receiving DL RS or PSS/SSS, etc.) and newly introduced operations (i.e., adjusting/updating TA and applying it to uplink transmission) operations) during the existing timing gap. If the size of the existing timing gap is insufficient to perform a new operation after performing the existing operation, the terminal may be configured to perform a newly introduced operation by adding a new timing gap to at least one of the front, rear, or middle of the existing timing gap.

Additionally, in special cases (e.g., when the network supports services only for NTN-capable terminals), the base station may be configured to configure/indicate to the terminal information on whether to use the existing timing gap. That is, if the terminal operation performed in the existing timing gap can be replaced with the terminal operation performed in the new timing gap, the existing timing gap may be configured to not be used in that cell.

Embodiment 1-3

This embodiment relates to a method of adaptively configuring/indicating whether to use a new timing gap in relation to uplink transmission.

Even if the base station configures/indicates the terminal to use a new timing gap, it may additionally configure/indicate the terminal as to whether the timing gap always exists.

When the base station indicates the terminal through higher layer signaling (e.g. SIB, RRC signaling, etc.) about the period, size, or use of a new timing gap, a new timing gap of the corresponding size may be configured/defined to always exist according to the corresponding cycle.

On the other hand, even if the base station indicates the terminal through higher layer signaling (e.g., SIB, RRC signaling, etc.) about the period, size, or use of a new timing gap, the base station may indicate the terminal to continue performing uplink transmission without applying a new timing gap (i.e., without adjusting/updating the TA) for a specific reason before the timing gap actually exists. That is, the base station may indicate the terminal to skip a new timing gap. Here, the specific reason may include a case where a delay occurs longer than expected due to a timing gap when the base station receives an uplink signal and/or channel, a case where the base station determines that the corresponding uplink transmission can be received even if the terminal does not change the TA value applied to the uplink transmission, etc.

As one of the dynamic scheduling methods to avoid applying a new timing gap, a method of indicating whether to apply a new timing gap (or whether to skip it) by transmitting a PDCCH (i.e., DCI) or a Wake Up Signal (WUS) before a point where a new timing gap may exist may be considered. Here, when considering DCI, the DCI may correspond to a UE group specific DCI, such as a paging DCI. In addition, because DCI monitoring may or may not be possible during transmission of uplink signals and/or channels depending on the terminal's capabilities (e.g., frequency division duplex (FDD), half duplex (HD)-FDD, etc.), the operation may be indicated to be UE capability specific (or UE specific).

Additionally, a method of dynamically changing the size of the new timing gap according to the needs of the base station may be considered. in other words, when the base station indicates the terminal to use a new timing gap to transmit the uplink signal and/or channel by applying the correct TA, but the reception of the uplink signal and/or channel is not smooth from the base station reception perspective, the base station may reconfigure the period, size, etc. of the new timing gap.

For example, the base station may reconfigure the period and size of the timing gap to be used when transmitting a subsequent uplink signal and/or channel through higher layer signaling and/or MAC CE. In the case of the RACH procedure, the base station may indicate the above-described reconfigure parameters through message 2/4 (msg. 2/4) or message B, and may also indicate the above-described reconfigure parameters through a retransmission DCI format, etc. In the case of PUSCH, the base station may indicate the above-described reconfigure parameters using a DCI format for scheduling uplink.

In the above-mentioned proposed method, the terminal may miss the DCI transmitted by the base station, and thus ambiguity may occur regarding the presence or absence of a new timing gap. Therefore, when dynamically indicating whether to operate a new timing gap through the above-described DCI, etc., the terminal may be configured to receive the corresponding DCI and transmit a HARQ-ACK for receiving the corresponding DCI to the base station. Alternatively, the base station dynamically indicates the terminal to use the new timing gap through DCI, etc., but in case the terminal misses the DCI, the base station may be configured to detect whether the terminal is transmitting an uplink signal and/or channel during the new timing gap. If the base station determines that the terminal continues to transmit uplink signals and/or channels even in the new timing gap, the base station may be configured to indicate to stop transmission of the corresponding uplink signal and/or channel in advance.

Alternatively, if the terminal misses the corresponding DCI (or does not receive a separate instruction through the DCI), the terminal may assume that the new timing gap is used as the default. At this time, the base station may be configured to retransmit the DCI during a new timing gap in case the terminal may miss the DCI. In addition, the terminal may be configured to additionally monitor a specific search space or a specific DCI during the new timing gap.

In the case of NPRACH repeated transmission, separate settings for contention free random access (CFRA) and contention based random access (CBRA) may be required.

For example, in the case of CFRA (e.g., NPDCCH order RACH procedure, etc.), the base station may add a specific field for whether to configure a new timing gap through the DCI format and dynamically configure/indicate the terminal whether to set it or not. In other words, even if the terminal has been semi-statically set whether to set a new timing gap through higher layer signaling (e.g., SIB, RRC signaling, etc.), the base station may dynamically configure/indicate the terminal whether to configure a new timing gap through the DCI format indicating the NPDCCH order. Even if there is no field in the DCI format indicating whether to configure a new timing gap, the terminal may be configured to follow what is set through existing higher layer signaling (e.g., SIB, RRC signaling, etc.).

For another example, in the case of CBRA (e.g., initial access RACH procedure, etc.), the base station may semi-statically determine whether to configure a new timing gap through higher layer signaling (e.g. SIB, RRC signaling, etc.).

In addition, when retransmission of the NPRACH preamble is applied, the base station may dynamically configure whether to configure a new timing gap through the corresponding DCI format.

Embodiment 1-4

This embodiment relates to whether a specific uplink signal and/or channel format is supported in relation to a new timing gap for uplink transmission.

Among the above-mentioned uplink signals and/or channels (e.g., NPRACH, NPUSCH, NPUCCH, etc.), a case of NPUSCH will be described.

For example, for 3.75 kHz single tone transmission in NPUSCH format 1, a single RU corresponds to 16 slots, and the length of a single slot at 3.75 kHz is 2 ms (0.5 ms*), which is 4 times the length of a single slot at 15 kHz. 4), and so, the length of a single RU is 32 ms. In this case, since the total time to transmit a single RU is greater than the maximum time that does not exceed the timing error limit calculated previously (e.g., 27.95 ms), the new timing gap may be configured to exist (or be introduced) in the middle of the single RU transmission.

For example, a new timing gap may be configured to exist every 8 slots (i.e., 16 ms) of 3.75 kHz. That is, not only does a new timing gap exist for each repeated transmission (repetition), but it may be configured so that a new timing gap exists even after a specific position of the RU for each repeated transmission (e.g., the position where half the slots were transmitted). As another example, a new timing gap may be configured to exist every 13 slots (i.e., 26 ms) of 3.75 kHz. In this case, regardless of the repetition number, a new timing gap may be configured to exist after transmitting a specific number of slots (e.g., a total of 13 slots).

For uplink signals and/or channels, etc., uplink signals and/or channels (e.g., NPRACH/NPUSCH/NPUCCH formats, etc.) longer than the maximum time (e.g., 27.95 ms) for which a single transmission unit does not exceed the previously calculated timing error limit. may be configured to not be supported in IoT NTN. In other words, only uplink signals and/or channels (e.g. NPRACH/NPUSCH/NPUCCH format, etc.) for which a new timing gap may exist after transmitting at least one single transmission unit may be configured to be serviced in the IoT NTN. Alternatively, the base station may configure/indicate the terminal to provide information on whether the network serving the NTN supports the format of the specific uplink signal and/or channel described above through higher layer signaling (e.g., SIB, RRC signaling), etc.

Embodiment 2

Unlike the method described above, the time for the terminal to adjust/update the TA (i.e., UL TA) may be guaranteed through other methods described below without introducing a new timing gap.

Embodiment 2-1

This embodiment relates to a method of dropping, puncturing, postpone, and/or rate-matching a portion of the uplink signal and/or channel for TA adjustment/updating of the terminal.

In a case of that an explicit uplink timing gap is not introduced, if the terminal applies an operation to adjust/update the TA without applying methods such as dropping, puncturing, or delaying a part of the uplink signal and/or channel, the same problem as in FIG. 12 may occur.

FIG. 12 is a diagram illustrating uplink transmission supported by a wireless communication system to which the present disclosure may be applied. Referring to FIG. 12, it is assumed that the terminal repeatedly transmits the NRPACH preamble.

FIG. 12(*a*) illustrates an example in which an existing terminal repeatedly transmits (i.e., transmits) the NPRACH preamble. FIG. 12(*b*) illustrates an example of a case where the terminal is configured to adjust/update the TA during uplink signal and/or channel transmission without an uplink timing gap.

Referring to FIG. 12(*b*), in the case of a terminal performing single tone transmission (e.g., NPRACH, NPUSCH, NPUCCH, etc.), if the terminal is configured to adjust/update the TA and apply it when repeat transmission N+1 times (i.e., N-th repeat transmission) after N repeated transmission (i.e., N−1th repetitive transmission) without a timing gap, the terminal may need to perform multi tone transmission at a specific timing. In the case of NB-IoT, single tone transmission is a mandatory feature for the UE's uplink transmission, and multi-tone transmission is an optional feature, and so a terminal that is unable to transmit multiple tones may not perform the operation shown in FIG. 12(*b*). In particular, for uplink signals and/or channels (e.g., NPRACH, NPUSCH, NPUCCH, etc.) required for the initial access process, since all terminals need to be configured up to operate normally, a solution to this needs to be considered.

Accordingly, by dropping, puncturing, delaying, and/or rate-matching portions of the uplink signal and/or channel, the terminal may be configured to adjust/update the TA (i.e., UL TA), or recalculate the TA to adjust/update during that time.

In the case of NPRACH, the NPRACH preamble consists of a plurality of symbol groups, and each symbol group consists of a CP and a plurality of symbols. Therefore, if the terminal is configured to adjust/update the TA when transmitting the NRPACH preamble corresponding to a specific number of repetitions (e.g., N) according to the pre-configured/indicated period, a method of dropping, puncturing, delaying, and/or rate-matching a specific portions as shown in FIG. 13 may be considered as belowss.

Figure 13:
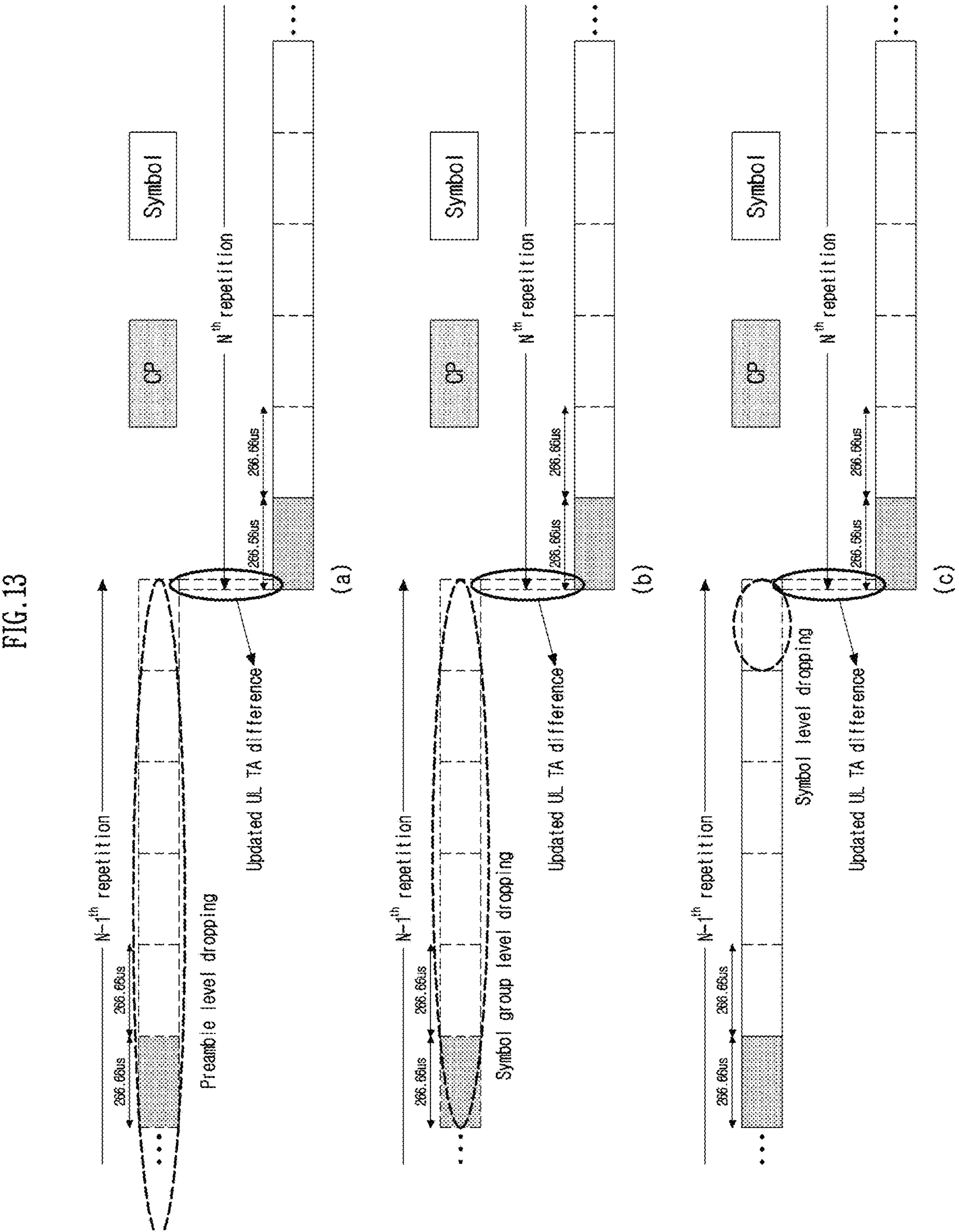
FIG. 13 is a diagram illustrating processing of a certain portion of uplink transmission supported by a wireless communication system to which the present disclosure may be applied.

FIG. 13 is a diagram illustrating processing of a certain portion of uplink transmission supported by a wireless communication system to which the present disclosure may be applied.

FIG. 13(*a*) illustrates an example of processing of the NPRACH preamble level in relation to uplink transmission. Referring to FIG. 13(*a*), in order to prevent multi-tone transmission of the terminal, the NPRACH preamble(s) may be configured/defined to be dropped, punctured, delayed, and/or rate-matched.

For example, the specific part described above may be the N−1th NPRACH preamble or the M NPRACH preambles preceding it, including the N−1th NPRACH preamble. In this case, because there is time for the terminal to adjust/update the TA by the length of one or more NPRACH preambles, the terminal may receive GNSS signaling, etc., calculate a new TA, and be configured to apply a new TA for transmission of the subsequent preamble during that time.

FIG. 13(*b*) illustrates an example of symbol group-level processing of the NPRACH preamble in relation to uplink transmission. Referring to FIG. 13(*b*), in order to prevent multi-tone transmission of the terminal, the NPRACH symbol group(s) may be configured/defined to be dropped, punctured, delayed, and/or rate-matched.

For example, the specific part described above may be the last NPRACH symbol group of the N−1th NPRACH preamble, or may be the M NPRACH symbol groups preceding it, including the last NPRACH symbol group. In this case, because there is time for the terminal to adjust/update the TA by the length of one or more NPRACH symbol groups, the terminal may newly calculate the TA using already received GNSS signaling, etc. as information, and may be configured to newly apply the TA for transmission of the subsequent preamble during this time.

FIG. 13(*c*) illustrates an example of symbol-level processing of a symbol group constituting the NPRACH preamble in relation to uplink transmission. Referring to FIG. 13(*c*), in order to prevent multi-tone transmission of the terminal, the NPRACH symbol(s) may be configured/defined to be dropped, punctured, delayed, and/or rate-matched.

For example, the specific part described above may be the last NPRACH symbol among the last NPRACH symbol group of the N−1th NPRACH preamble, or may be the M NPRACH symbols preceding it, including the last NPRACH symbol. In this case, because there is time for the terminal to adjust/update the TA by the length of one or more NPRACH symbols, the terminal may be configured to calculate a TA to be changed in advance and apply a new TA for transmission of the subsequent preamble during this time. That is, the terminal may be configured/indicated from the base station on the number of repetitions to change the TA, may calculate the TA value to be changed in advance before the first transmission, and then may be configured to adjust/update the TA at the specific time described above.

For another example, the specific part described above may be configured in absolute time, subframe, slot, or OFDM symbol units. That is, by configuring it to X ms, Y subframes, Z slots, or K OFDM symbols immediately before the Nth NPRACH preamble, the terminal may be configured to adjust/update the TA at the corresponding time.

The above-mentioned N value, M value, and/or X, Y, Z, K, etc. may be set as predefined and recognized between the terminal and the base station, and the base station may be configured to appropriately configure/indicate the corresponding information to the terminal as needed. In this case, the information may be delivered through at least one of higher layer signaling (e.g., SIB, RRC signaling, etc.) and/or dynamic signaling (e.g., DCI, MAC CE, etc.).

In addition, in the case of (N)PUSCH and/or (N)PUCCH, etc., a method of performing dropping, puncturing, delaying, or rate-matching at the subframe level, slot level, or OFDM symbol level in the above-described method may be considered. However, in this case, since the terminal may recognize in advance where the TA needs to be adjusted/updated based on the base station's configuration/indication or predefined information, etc., an appropriate method may be for the terminal to perform uplink transmission by rate-matching the corresponding portion. For example, if it is configured/indicated in advance to empty K OFDM symbols immediately before transmitting the Nth (N)PUSCH and/or (N)PUCCH, the terminal may be configured to transmit (N)PUSCH and/or (N)PUCCH, etc. by performing rate-matching while excluding the corresponding K OFDMs.

Embodiment 2-2

This embodiment relates to a method of configuring/indicating to support different operations according to UE capability in relation to TA adjustment/updating of the terminal.

The method proposed in Embodiment 2-1 described above is a method that may be configured for terminal(s) that do not support multi-tone transmission, and may be configured to be applied regardless of terminal capabilities. However, in the case of a terminal supporting multi-tone transmission, when operating in the above-described method, it is unable to transmit a portion of a specific uplink signal and/or channel even though it may transmit all.

Therefore, a method of configuring the above-described method to be performed according to terminal capability information may be considered. That is, a terminal capable of only single tone transmission may be configured to drop, puncture, delay, or rate-match a specific uplink signal and/or part of the channel as described above. On the other hand, a terminal capable of multi-tone transmission may be configured to perform multi-tone transmission in some sections by adjusting/updating the TA during uplink transmission without applying the above-described method. At this time, considering the interval in which multi-tone transmission is performed, it may be necessary to adjust the transmission power of the terminal. In other words, it is necessary to divide the transmission power applied to a single tone and apply it to multiple tones.

In the case of NPRACH, in which only single tone transmission is performed, a method of dividing operations according to terminal capabilities as described above may be applied. However, for (N)PUSCH and/or (N)PUCCH, etc., where single tone transmission and/or multi-tone transmission may be performed differently for each terminal, Based on at least one of the type of scheduled uplink channel, the number of frequency resources of the currently scheduled uplink resource (e.g., number of subcarriers), or terminal capability, The base station may configure/indicate the terminal whether to use the above-mentioned proposed method (e.g., dropping, puncturing, delaying, or rate-matching for a specific portion).

Embodiment 3

Hereinafter, a detailed configuration/indication method for adjusting/updating TA during transmission of an uplink signal and/or channel will be described.

Embodiment 3-1

This embodiment relates to a type of TA that may be adjusted/updated during transmission of an uplink signal and/or channel.

Among the TA values considered in the NTN, at least one of the UE-specific TA or the common TA may be configured to be adjusted/updated during uplink transmission. Here, the UE-specific TA may be a TA for compensating for the Round Trip Time (RTT) between the terminal and the satellite. The common TA may be a TA to compensate for the RTT between the reference point and the satellite.

A method may be considered in which only the UE-specific TA that the terminal may measure and adjust/update may be adjusted/updated during uplink transmission, since common TA parameters (e.g., common TA series, common TA drift ratio, etc.) may be indicated so that the base station may track the common TA, the common TA may also be configured to be adjusted/updated together.

In addition, N_TA, which is adjusted/updated as instructed by the Random Access Response (RAR) message used in existing NR and/or the TAC (TA command) of MAC CE, may be also adjusted/updated during uplink transmission. For example, when the terminal attempts to adjust/update the TA during transmission of an uplink signal and/or channel, the base station may be configured to adjust/update N_TA by indicating the TAC of the RAR message and/or MAC CE in advance.

The terminal may be configured to adjust/update the TA using the following methods.

First, based on the TA adjustment/update related parameter values set/instructed by the base station, the terminal may be configured to adjust/update each TA. For example, the common TA may be adjusted/updated based on the common TA drift rate set/instructed by the base station, etc. The UE-specific TA may be adjusted/updated based on the UE-specific TA drift rate configured/indicated by the base station. Here, under the assumption that the IoT terminal does not move significantly, the UE-specific TA drift rate may refer to a parameter that the base station calculates in advance how the UE-specific TA will change and delivers it to the terminal. Based on the terminal-specific TA value reported by the terminal (or based on the specific location of the cell (e.g., cell center)) and considering the satellite's orbit information Next, based on the TA adjustment/update related parameter values configured/indicated by the base station and/or the values obtained by the terminal itself, the terminal may be configured to adjust/update each TA. For example, the common TA may be adjusted/updated based on the common TA drift rate configured/indicated by the base station, etc. The UE-specific TA may be adjusted/updated based on GNSS signaling and satellite orbit information configured/indicated by the base station.

For example, if the base station indicates a terminal-specific TA drift rate, it may be configured to operate as in the first method described above, on the other hand, if the base station does not indicate a terminal-specific TA drift rate, it may be configured to operate like the second method described above.

Additionally, when adjusting/updating a TA while repeatedly transmitting an uplink signal and/or channel, a method of configuring a different adjustment/updating period for each TA may also be considered.

For example, the common TA may be configured to be adjusted/updated at a relatively shorter period. That is, the common TA may be configured to be adjusted/updated during the new timing gap described above (or during the time generated by puncturing a specific signal and/or channel) (and/or even during the existing timing gap). For example, a UE-specific TA may be configured to be adjusted/updated at a relatively longer period. That is, the UE-specific TA may be configured to be adjusted/updated only during the existing timing gap. In other words, the update period of the common TA may be configured shorter than the update period of the UE-specific TA.

Embodiment 3-2

This embodiment relates to a method of configuring/indicating whether to adjust/update TA during transmission of an uplink signal and/or channel depending on the type of satellite.

The types of satellites under consideration in the NTN may include at least one of a satellite type that change rapidly with time (e.g., LEO, MEO, etc.) or a satellite type that appear fixed even though they change over time (e.g., GEO, etc.). Therefore, depending on which satellite will be used to service the NTN, the base station needs to deliver to the terminal information on whether to perform TA adjustment/update during transmission of the uplink signal and/or channel.

Therefore, whether to proceed with TA adjustment/update during transmission of an uplink signal and/or channel may be configured to be broadcast in a cell-specific manner. As a specific example, an indication parameter may be introduced in higher layer signaling (e.g., SIB, RRC signaling, etc.) in an explicit manner to adjust/update the TA during transmission of the uplink signal and/or channel. In an implicit way, the base station may indicate the terminal to adjust/update the TA during transmission of the uplink signal and/or channel, by indicating a new timing gap or directing certain portions of the uplink signal and/or channel to be dropped, punctured, delayed, or rate-matched.

Although the methods described above in the present disclosure are mainly explained for LTE NB-IoT, they may be similarly set/applied to LTE eMTC and/or NR reduced capability (REDCAP), etc.

It is clear that examples of the above-described methods may also be included as one of the implementation methods of the present disclosure, and thus may be regarded as a type of proposed method. Additionally, the above-described methods may be implemented independently, but may also be implemented in the form of a combination (or merge) of some methods. Information on whether the above-mentioned methods are applied (or information about the rules of the above-mentioned methods) may be defined so that the base station informs the terminal through predefined signaling (e.g., physical layer signaling and/or higher layer signaling). For example, upper layers may include one or more of the following functional layers: MAC, RLC, PDCP, RRC, and SDAP.

Additionally, the methods proposed in this specification may be extended and applied to techniques for estimating the exact location of a terminal.

Figure 14:
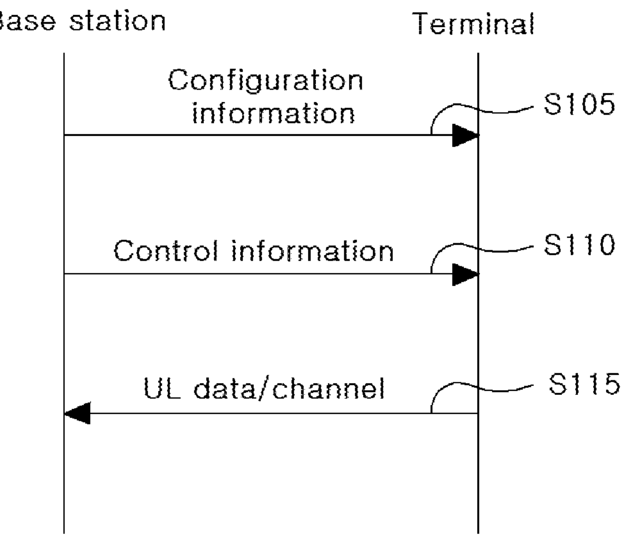
FIG. 14 is a diagram illustrating the signaling procedure according to an embodiment of the present disclosure.

FIG. 14 is a diagram illustrating a signaling process according to an embodiment of the present disclosure.

FIG. 14 represents an example of signaling between a network side (or a base station) and a terminal (UE) in a situation when at least one physical channel/signal to which the above-described examples of the present disclosure (e.g., Embodiment 1, 2, 3, and a combination of at least one of examples described in detailed embodiments thereof) may be applied is NTN-transmitted.

Figure 15:
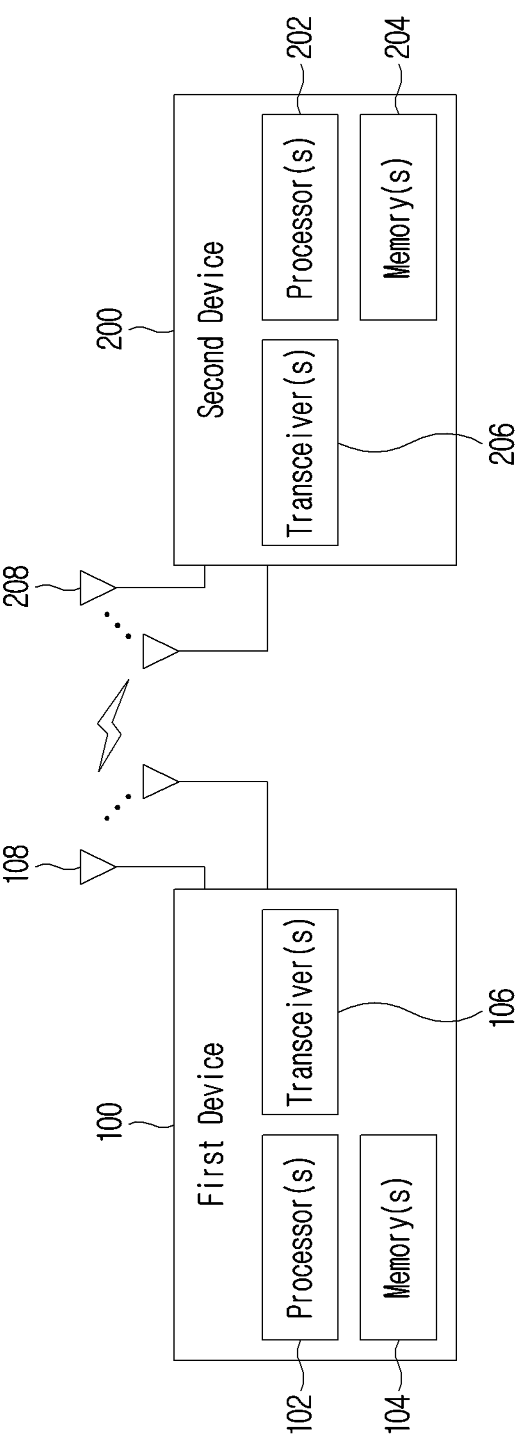
FIG. 15 is a diagram which illustrates a block diagram of a wireless communication device according to an embodiment of the present disclosure.

Here, UE/a network side is illustrative and may be applied by being replaced with a variety of devices as described by referring to FIG. 15. FIG. 14 is for convenience of a description, and it does not limit a scope of the present disclosure. In addition, some step(s) shown in FIG. 14 may be omitted depending on a situation and/or a configuration, etc. In addition, in an operation of a network side/UE in FIG. 14, the above-described uplink transmission or reception operation, etc. may be referred to or used.

In the following description, a network side may be one base station including a plurality of TRPs or may be one cell including a plurality of TRPs. Alternatively, a network side may include a plurality of remote radio heads (RRH)/remote radio units (RRU). In an example, an ideal/non-ideal backhaul may be configured between TRP 1 and TRP 2 configuring a network side. In addition, although the following description is described based on multiple TRPs, it may be extended and applied equally to transmission through multiple panels/cells, and it may be also extended and applied to transmission through multiple RRHs/RRUs.

In addition, in the following description, it is described based on a "TRP", but as described above, "TRP" may be applied by being replaced with an expression such as a panel, an antenna array, a cell (e.g., a macro cell/a small cell/a picocell, etc.), a transmission point (TP), a base station (a base station, gNB, etc.), etc. As described above, a TRP may be distinguished according to information (e.g., a CORESET index, a ID) on a CORESET group (or a CORESET pool). In an example, when one terminal is configured to perform transmission or reception with multiple TRPs (or cells), it may mean that multiple CORESET groups (or CORESET pools) are configured for one terminal. Such a configuration for a CORESET group (or a CORESET pool) may be performed through higher layer signaling (e.g., RRC signaling, etc.).

In addition, a base station may generally mean an object which performs transmission or reception of data with a terminal. For example, the base station may be a concept including at least one transmission point (TP), at least one transmission and reception point (TRP), etc. In addition, a TP and/or a TRP may include a panel of a base station, a transmission and reception unit, etc.

A terminal may receive configuration information from a base station S105. For example, the configuration information may include NTN-related configuration information/configuration information for uplink transmission or reception (e.g., PUCCH-config/PUSCH-config)/a HARQ process-related configuration (e.g., whether HARQ feedback is enabled or disabled, the number of HARQ processes, etc.)/a CSI reporting-related configuration (e.g., a CSI report configuration (config)/CSI report quantity/a CSI-RS resource configuration (resource config), etc.), etc. described in the above-described embodiment (e.g., Embodiment 1, 2, and a combination of at least one of examples described in detailed embodiments thereof). For example, the configuration information may include Satellite orbit information, configuration/indication of parameters for terminal time reference, configuration/indication information related to the adjustment/update period according to the terminal's time reference, uplink transmission according to application of terminal parameters and time reference, configuration information related to reporting on adjusted/updated time reference values, etc. For example, the configuration information may be transmitted through higher layer (e.g., RRC or a MAC CE) signaling.

For example, the above-described operation in S105 that a terminal (100 or 200 in FIG. 15) receives the configuration information from a base station (200 or 100 in FIG. 15) may be implemented by a device of FIG. 15 to be described below. For example, in reference to FIG. 15, at least one processor 102 may control at least one transceiver 106 and/or at least one memory 104, etc. to receive the configuration information, and at least one transceiver 106 may receive the configuration information from a network side.

A terminal may receive control information from a base station S110. For example, control information may include information related to a configuration/an indication related to update/reporting/application of a time reference adjustment value of a terminal. For example, control information may include configuration/indication information related to reception of a common TA parameter or acquisition of a UE-specific TA parameter, scheduling information for application of a TA parameter, a BWP change or uplink transmission, etc.

For example, the above-described operation in S110 that UE (100 or 200 in FIG. 15) receives the control information from a base station (200 or 100 in FIG. 15) may be implemented by a device of FIG. 15 to be described below. For example, in reference to FIG. 15, at least one processor 102 may control at least one transceiver 106 and/or at least one memory 104, etc. to receive the control information, and at least one transceiver 106 may receive the control information from a base station.

A terminal may transmit uplink data/channel to a base station S115. For example, a terminal may transmit uplink data/channel to a base station based on the above-described embodiment (e.g., Embodiment 1, 2, 3 and a combination of at least one of examples described in detailed embodiments thereof), etc. For example, a terminal may determine an uplink transmission timing based on at least one of a common TA parameter or a UE-specific TA parameter and transmit to a base station an uplink signal/channel according to a determined uplink transmission timing.

For example, the above-described operation in S115 that a terminal (100 or 200 in FIG. 15) transmits uplink data/channel may be implemented by a device of FIG. 15 below. For example, in reference to FIG. 15, at least one processor 102 may control at least one memory 104, etc. to transmit the uplink data/channel.

As mentioned above, the above-described signaling of a base station/a terminal and embodiment (e.g., Embodiment 1, 2, 3, and a combination of at least one of examples described in detailed embodiments thereof) may be implemented by a device which will be described by referring to FIG. 15. For example, a base station may correspond to a first device 100 and a terminal may correspond to a second device 200, and the opposite case may be also considered in some cases.

For example, the above-described signaling and operation of a base station/a terminal (e.g., Embodiment 1, 2, 3, and a combination of at least one of examples described in detailed embodiments thereof) may be processed by at least one processor (e.g., 102, 202) in FIG. 15, and the above-described signaling and operation of a base station/a terminal (e.g., Embodiment 1, 2, 3, and a combination of at least one of examples described in detailed embodiments thereof) may be stored in a memory (e.g., at least one memory (e.g., 104, 204) in FIG. 15) in a command/program (e.g., an instruction, an executable code) form for driving at least one processor (e.g., 102, 202) in FIG. 15.

General Device to which the Present Disclosure May be Applied

FIG. 15 illustrates a block diagram of a wireless communication device according to an embodiment of the present disclosure.

In reference to FIG. 15, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

receiving first information for a satellite orbit, second information for a common Timing Advance (TA), and third information corresponding to when TA adjustment is applied; and transmitting a narrowband physical random access channel by applying a TA value based on the first information for the satellite orbit and the second information for the common TA, wherein an adjustment related to the TA value is performed based on the third information, and wherein the third information is related with a product of a 2^n value and a length of a random access preamble, where n is a positive integer including 0.

2. The method of claim 1, wherein:

the third information is received through a system information block.

3. The method of claim 1, wherein:

the unit is configured based on a type of the satellite orbit.

4. The method of claim 1, wherein:

the first TA value is calculated based on the common TA and a UE specific TA calculated by a user equipment (UE) based on the first information for the satellite orbit.

5. The method of claim 4, wherein:

the adjustment is configured to be performed within a pre-configured time interval based on the unit, and the pre-configured time interval is configured based on at least one of the common TA and the UE specific TA.

6. The method of claim 5, wherein:

at least one of whether to apply the pre-configured time interval or size of the pre-configured time interval is indicated through at least one of higher layer signaling or downlink control information.

7. The method of claim 4, wherein:

at least one of the common TA or the UE specific TA is adjusted when the adjustment is performed.

8. The method of claim 7, wherein:

an adjustment interval of the common TA is configured shorter than an adjustment interval of the UE specific TA.

9. The method of claim 1, wherein:

the length of the random access preamble is a duration of preamble repetition unit.

10. The method of claim 1, wherein:

the length of the random access preamble is configured differently based on a format of the random access preamble.

11. The method of claim 1, wherein:

transmission of the narrowband random access channel is based on a non-terrestrial network (NTN).

12. A user equipment comprising:

at least one transceiver; and at least one processor connected to the at least one transceiver, wherein the at least one processor is configured to:

receive first information for a satellite orbit, second information for a common Timing Advance (TA), and third information corresponding to when TA adjustment is applied; and transmit a narrowband physical random access channel by applying a TA value based on the first information for the satellite orbit and the second information for the common TA, wherein an adjustment related to the TA value is performed based on the third information; and wherein the third information is related with a product of a 2^n value and a length of a random access preamble, where n is a positive integer including 0.

13. A base station comprising:

at least one transceiver; and at least one processor connected to the at least one transceiver, wherein the at least one processor is configured to:

transmit first information for a satellite orbit, second information for a common Timing Advance (TA), and third information corresponding to when TA adjustment is applied; and receive a narrowband physical random access channel to which a TA value based on the first information for the satellite orbit and the second information for the common TA is applied, wherein an adjustment related to the TA value is performed based on the third information is, wherein the third information is related with a product of a 2^n value and a length of a random access preamble, where n is a positive integer including 0.

* * * * *